United States Patent [19]

Hasuo et al.

[11] Patent Number: 5,583,614

[45] Date of Patent: Dec. 10, 1996

[54] IMAGE PROCESSING APPARATUS AND METHOD FOR DETERMINING WHETHER AN ORIGINAL CONTAINS A SPECIFIED IMAGE

[75] Inventors: Kamon Hasuo, Kawasaki; Ryuichi Masuda, Funabashi; Yuichi Sato; Ken-Ichi Outa, both of Yokohama, all of Japan

[73] Assignee: Canon Kabushiki Kaisha, Tokyo, Japan

[21] Appl. No.: 425,157

[22] Filed: Apr. 19, 1995

Related U.S. Application Data

[62] Division of Ser. No. 181,068, Jan. 14, 1994, Pat. No. 5,434,649, which is a division of Ser. No. 32,210, Mar. 15, 1993, Pat. No. 5,321,470, which is a continuation of Ser. No. 351,165, May 12, 1989, abandoned.

[30] Foreign Application Priority Data

| May 30, 1988 | [JP] | Japan | 63-130336 |
| May 13, 1988 | [JP] | Japan | 63-114801 |
| May 13, 1988 | [JP] | Japan | 63-114802 |
| Jun. 17, 1988 | [JP] | Japan | 63-148225 |
| Jun. 17, 1988 | [JP] | Japan | 63-148226 |

[51] Int. Cl.⁶ .................................................. G03G 21/00
[52] U.S. Cl. ........................... 355/201; 283/902; 380/3; 382/165
[58] Field of Search ................. 355/77, 133, 201, 355/206; 283/902; 347/900; 380/3–5, 54; 382/10, 14, 30, 34, 41, 48, 50, 56, 135, 165, 309; 356/71; 358/452, 470, 501, 530; 364/728.05

[56] References Cited

U.S. PATENT DOCUMENTS

| 2,919,426 | 12/1959 | Rohland | 382/202 |
| 3,533,068 | 10/1970 | Hanaki et al. | 382/227 |
| 3,852,088 | 12/1974 | Godlewski et al. | 355/201 X |
| 3,873,974 | 3/1975 | Bouton et al. | 382/134 |
| 4,066,280 | 1/1978 | LaCapria | 283/902 X |
| 4,118,122 | 10/1978 | Rees et al. | 355/133 X |
| 4,153,897 | 5/1979 | Yasuda et al. | 382/216 |

(List continued on next page.)

FOREIGN PATENT DOCUMENTS

| 056116 | 7/1982 | European Pat. Off. . |
| 067898 | 12/1982 | European Pat. Off. . |
| 0101115 | 2/1984 | European Pat. Off. . |
| 253935 | 1/1988 | European Pat. Off. . |
| 0295876 | 12/1988 | European Pat. Off. . |
| 0303474 | 2/1989 | European Pat. Off. . |
| 3001588 | 7/1981 | Germany . |
| 3904129 | 8/1989 | Germany . |
| 55-123270 | 9/1980 | Japan . |
| 60-229572 | 11/1985 | Japan . |
| 2155860 | 10/1985 | United Kingdom . |

OTHER PUBLICATIONS

Bruce, G. D., "Unauthorized Copy Prevention", IBM Tech. Disc. Bulletin vol. 18, No. 1, Jun. 1975, pp. 59–60.

Marinace, J. C., "Copy System for Confidential Papers", IBM Tech Disc. Bulletin, vol. 15, No. 7, Dec. 1972, p. 2328.

(List continued on next page.)

*Primary Examiner*—Arthur T. Grimley
*Assistant Examiner*—Shuk Yin Lee
*Attorney, Agent, or Firm*—Fitzpatrick, Cella, Harper & Scinto

[57] ABSTRACT

An image processing apparatus and method includes a scanner for scanning an original and generating electrical image data representing an image of the original to be processed, a processor for processing the electrical image data supplied by the scanner, and a device for determining whether the original represented by the electrical image data contains a specified image based on the electrical image data supplied by the scanner. The scanner scans the original a plurality of times and the device performs its determination operation on the same original a plurality of times, once for each scanning operation.

14 Claims, 23 Drawing Sheets

U.S. PATENT DOCUMENTS

| | | | |
|---|---|---|---|
| 4,179,685 | 12/1979 | O'Maley | 382/135 |
| 4,228,421 | 10/1980 | Asada | 382/209 |
| 4,281,921 | 8/1981 | Van Auken | 355/133 X |
| 4,325,981 | 4/1982 | Sugiura et al. | 283/70 |
| 4,446,531 | 5/1984 | Tanaka | 364/728.05 |
| 4,463,386 | 7/1984 | Goddard et al. | 358/261.3 |
| 4,586,811 | 5/1986 | Kubo et al. | 355/201 |
| 4,641,355 | 2/1987 | Hongo et al. | 382/220 |
| 4,682,190 | 7/1987 | Ikeda | 347/900 X |
| 4,723,149 | 2/1988 | Harada | 355/201 |
| 4,728,984 | 3/1988 | Daniele | 355/201 X |
| 4,739,377 | 4/1988 | Allen | 355/201 X |
| 4,773,958 | 9/1988 | Suzuki | 156/313 |
| 4,797,945 | 1/1989 | Suzuki et al. | 382/253 |
| 4,823,393 | 4/1989 | Kawakami | 382/135 |
| 4,881,268 | 11/1989 | Uchida et al. | 382/135 |
| 4,908,873 | 3/1980 | Philibert et al. | 382/100 |
| 5,020,110 | 5/1991 | Chominski | 382/137 |
| 5,216,724 | 6/1993 | Suzuki et al. | 355/201 X |
| 5,321,470 | 6/1994 | Hasuo et al. | 355/201 |
| 5,379,093 | 1/1995 | Hashimoto et al. | 355/201 |
| 5,424,807 | 6/1995 | Ohmura | 355/201 |
| 5,426,710 | 6/1995 | Suzuki et al. | 355/201 X |

OTHER PUBLICATIONS

Hildebrandt, L. H., "Document Security for Copiers", IBM Tech. Disclosure Bulletin, vol. 19, No. 9, Feb. 1977, pp. 3293–3294.

Guido, A. A., "Preventing Copying of Classified Information", IBM Technical Disclosure Bulletin, vol. 19, No. 4, Sep. 1976, pp. 1469–1470.

Patent Abstracts of Japan, vol. 13, No. 269 (P–888) (3617) (Kokai 01–061777) (Takagi).

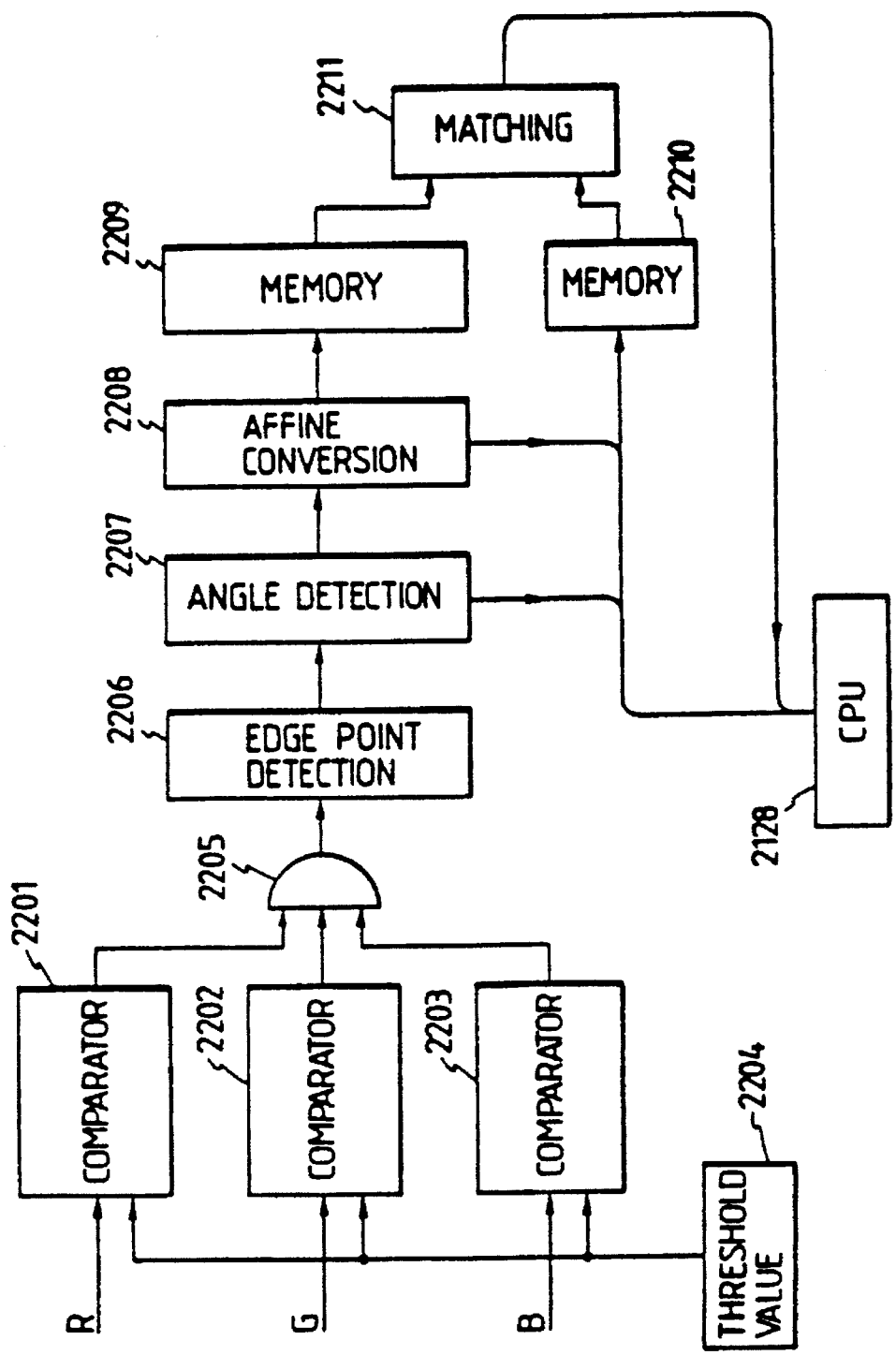

IMAGE PROCESSING APPARATUS AND METHOD FOR DETERMINING WHETHER AN ORIGINAL CONTAINS A SPECIFIED IMAGE

This application is a division of application Ser. No. 08/181,068, filed Jan. 14, 1994, U.S. Pat. No. 5,434,649, which is a division of application Ser. No. 08/032,210, U.S. Pat. 5,321,470, filed Mar. 15, 1993, now U.S. Pat. 5,321,470 which in turn is a continuation of application Ser. No. 07/351,165, filed May 12, 1989, now abandoned.

BACKGROUND OF THE INVENTION

1. Field of the Invention

The present invention relates to an image processing apparatus for processing an input image and recording the image on a recording medium, and more particularly to an image processing apparatus which is suitably applied to a color copying apparatus that is capable of effecting the color copying of an image of an original.

2. Related Background Art

Conventionally, an image processing apparatus is adapted to read an image of an original placed on an original table or the like and effect a faithful recording (copying) operation, as instructed by the operator.

The progress in copying technology in recent years, coupled with that in color-image recording technology, has made it possible to output a copy image which is very close to an image of an original.

Accordingly, with a conventional apparatus, if money or a certificate such as a negotiable instrument the copying of which is prohibited is placed on the original table and copying is effected by misusing the apparatus or by way of a "prank" or the like, copying is effected as instructed by the operator. Accordingly, there is the possibility of readily inducing an act of forgery, thereby presenting a major social problem.

SUMMARY OF THE INVENTION

Accordingly, an object of the present invention is to provide an image processing apparatus which is capable of preventing in advance an act of forgery of money, a negotiable instrument, or the like, thereby overcoming the above-described problem of the conventional art.

To this end, in accordance with the present invention, there is provided an image processing apparatus comprising: means for determining whether or not an original to be copied is an original having a specific pattern; and means for controlling an output of copying on the basis of an output of the determining means. For instance, if the original to be copies is a banknote or an negotiable instrument, detection is carried out to that effect and image processing is controlled.

Another object of the present invention is to provide an image processing apparatus which effects suitable processing not only when an image utterly identical with a predetermined image but also an image similar to the specified image are input, thereby preventing forgery.

According to this aspect of the invention, there is provided an image processing apparatus comprising: input means for inputting information on an image; evaluating means for evaluating on the basis of a specified standard to what extent an input image is similar to a predetermined image; and conversion processing means for providing predetermined conversion processing to the input information on an image in correspondence with the evaluation of the evaluating means. Thus, a reproduced image is modified in accordance with whether it is an image of a bill or a stock.

Still another object of the present invention is to provide an image processing apparatus which is capable of improving the accuracy of a determination as to whether or not an input image is a predetermined image, and of minimizing the frequency at which faults occur due to mistaken determinations.

A further object of the present invention is to provide a novel copying apparatus which has not heretofore existed.

It is another object of the present invention to provide an image processing apparatus and method for increasing the reliability with which a forgery of an original image can be determined.

The present invention achieves this objective by providing an image processing apparatus comprising scanning means, processing means and determining means. The scanning means scans an original and generates electrical image data representing an image of the original to be processed. The processing means processes the electrical image data supplied by the scanning means. The determining means determines whether or not the original represented by the electrical image data contains a specified image based on the electrical image data supplied by the scanning means. The scanning means scans the original image a plurality of times and the determining means performs its determination operation on the same original a plurality of times in response to scanning the original by the scanning means.

According to another aspect, the present invention which achieves these objectives relates to an image processing method comprising the steps of scanning an original and generating electrical image data representing an image of the original to be processed, processing the electrical image data supplied, and determining whether or not the original represented by the electrical image data contains a specified image based on the electrical image data supplied. The scanning step is carried out on the same original a plurality of times and the determining step is effected on the same original a plurality of times, once for each scanning.

The above and other objects, features and advantages of the present invention will become more apparent from the following detailed description of the invention when read in conjunction with the accompanying drawings.

BRIEF DESCRIPTION OF THE DRAWINGS

FIG. 27 is a block diagram illustrating the configuration of a recognition circuit shown in FIG. 26.

DESCRIPTION OF THE PREFERRED EMBODIMENTS

Referring now to the accompanying drawings, a detailed description will be given of the preferred embodiments of the present invention.

Figure 1:
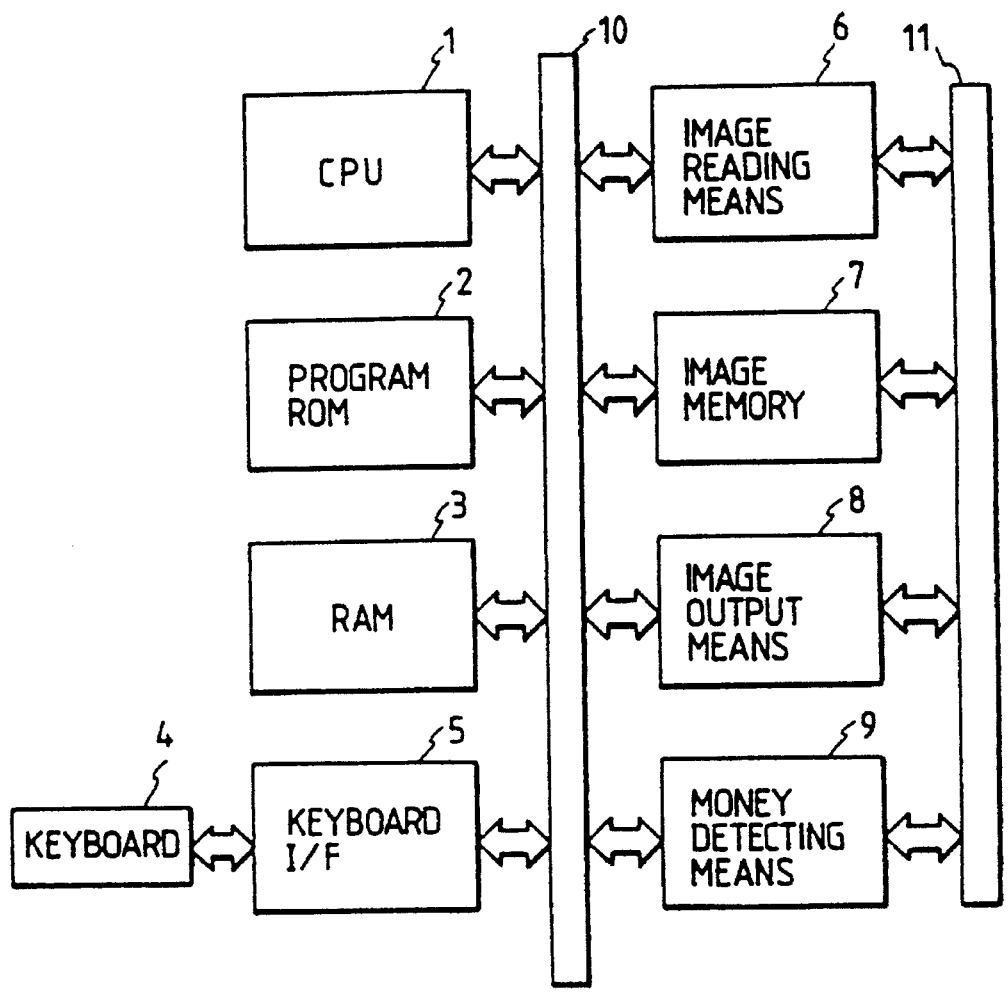
FIG. 1 is a block diagram of a copying apparatus in accordance with a first embodiment of the present invention.

FIG. 1 illustrates a first embodiment of an image processing apparatus in accordance with the present invention.

Figure 4:
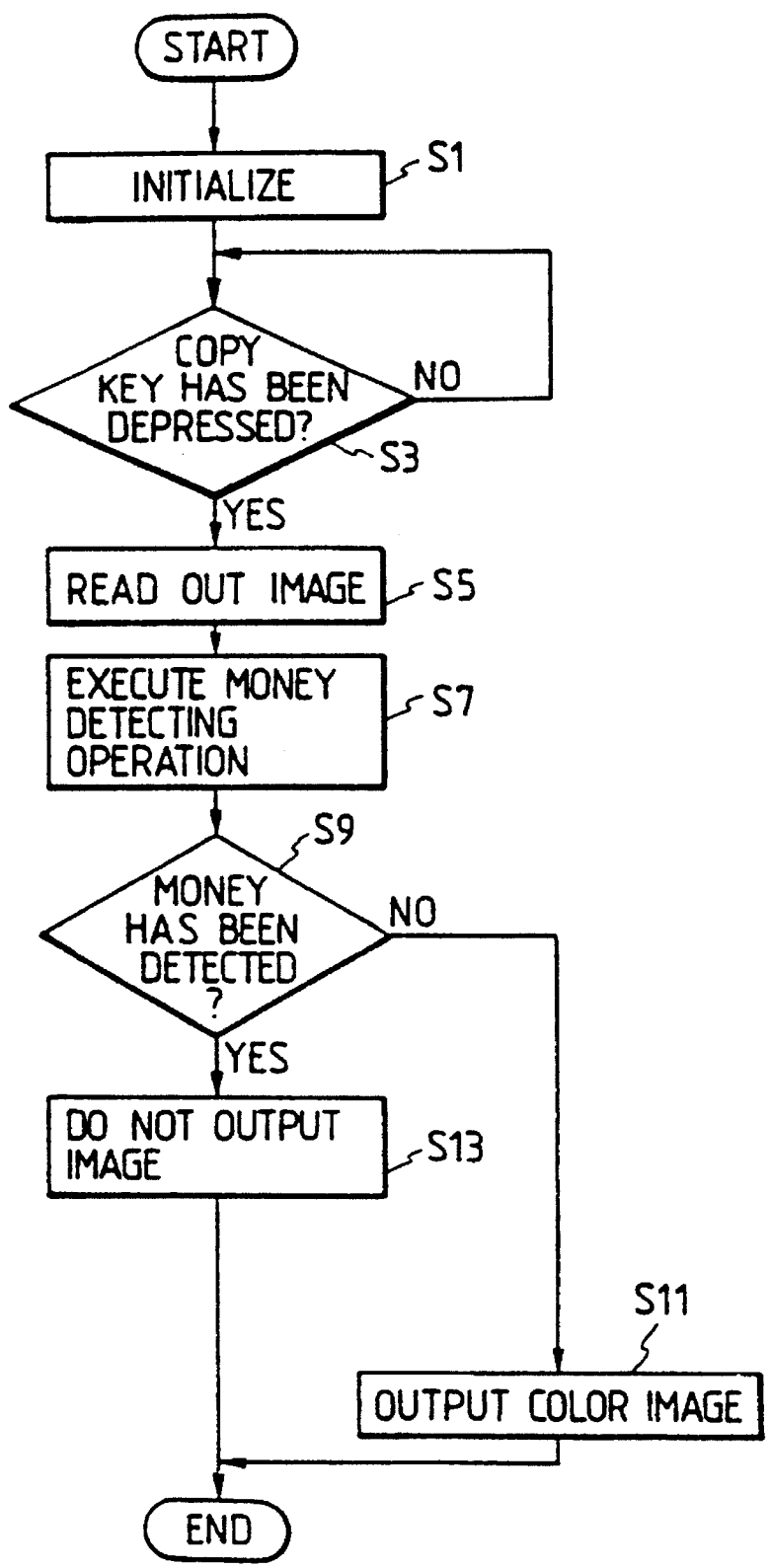
FIG. 4 is a flowchart illustrating an example of a control procedure in accordance with the first embodiment.

In FIG. 1, the image processing apparatus comprises the following component parts: a central arithmetic processing unit 1 in the form of a microcomputer; a ROM 2 in which an operation program and the like for the CPU 1, which will be described later with reference to FIG. 4, are stored; a RAM 3 used for registration or the like in a process of control by the CPU 1; a keyboard 4 having a known group of input keys, such as a key for commanding copy start and a key for setting the number of copies to be made; a keyboard interface circuit 5 for connecting the keyboard 4 to a system bus 10; image reading means 6 for reading an image depicted on a set original; an image memory 7 for storing image data which has been read; and image outputting means 8 for outputting the stored image data; bill detecting means 9 for detecting whether or not image data of a certificate the copying of which is prohibited, such as money (hereinafter referred to as a bill) or a negotiable instrument (hereinafter referred to as a stock), is present in the image memory; and an image data bus 11 for transmitting the image data between the respective parts 6–9 at high speed.

Figure 2:
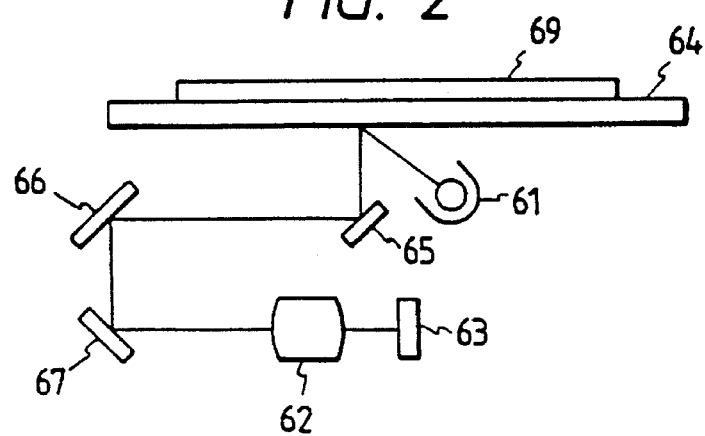
FIG. 2 is a schematic side elevational view illustrating an example of the arrangement of image reading means shown in FIG. 1.

FIG. 2 illustrates an example of the arrangement of the image reading means. In this drawing, an original illuminating lamp 61 is adapted to illuminate the surface of the original, a zoom lens 62 is adapted to form an image of the original on a CCD serving as a reading element, a CCD 63 is adapted to convert an image into an electrical signal, and an original table 64 is composed of a transparent plate. Reference numerals 65, 66, and 67 denote mirrors.

In FIG. 2, the original illuminating lamp 61 and the mirror 65 scan an original 69 placed on the original table 64 with a surface thereof to be read facing downward. The light reflected from the surface of the original is introduced into the zoom lens 62 via the group of mirrors, and an image is then formed on the CCD 63 so as to be converted into an electrical signal.

Figure 3:
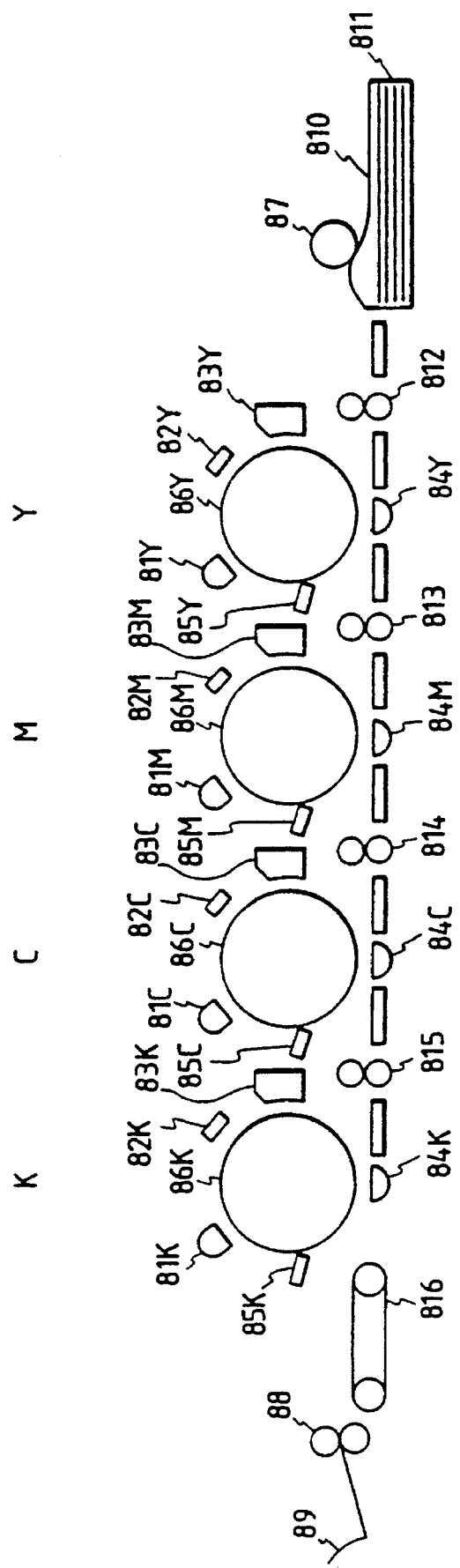
FIG. 3 is a schematic side elevational view illustrating an example of the arrangement of image outputting means.

FIG. 3 illustrates an example of the arrangement of the image output means 8.

In FIG. 3, reference characters 81Y, 81M, 81C, and 81K respectively denote a primary charger for yellow, a primary charger for magenta, a primary charger for cyan, and a primary charger for black. It should be noted that the accompanying letters Y, M, C, and K hereinafter similarly indicate that the components having denoted by these characters are for yellow, magenta, cyan, and black, respectively.

An LED array 82 is turned on and off in response to image data, and a developing device 83 is adapted to apply a developer (toner or the like) of a corresponding color. Numeral 84 denotes a transfer charger; 85, a cleaner; and 86, a photosensitive drum.

A pickup roller 87 is adapted to pick up a recording medium (hereinafter referred to as copy paper) 810 accommodated in a paper feeding cassette 811 by separating sheets of the copy paper one by one. Pairs of conveyor rollers 812–815 are provided in a passage for conveying the copy paper. A conveyor belt 816 is adapted to discharge recorded copy paper; fixing rollers 88 are provided in the vicinity of a discharge outlet; and a discharged paper tray 89 is used to stack discharged copy paper thereon.

FIG. 4 illustrates an example of a control procedure in accordance with this embodiment, and the operation of the above-described arrangement will be described with reference to this drawing.

First, if a power switch (not shown) is turned on, the CPU 1 executes a predetermined initializing routine (Step S1), and is set on standby for receiving a command from the keyboard 4 after the temperature of the fixing rollers 88 reaches a predetermined level (Step S3).

When the operator instructs a copying operation by using the keyboard 1, the CPU 1 drives the image reading means 6 to read out an image of the original (Step S5). The reading of this image is effected four times by changing over a color filter, and is developed in the image memory 7 for each color (yellow, magenta, cyan and black).

Subsequently, the bill detecting means 9 is operated, and a determination is made as to whether or not the image data on the image memory 7 is that of a bill or a stock certificate (Step S7). In this embodiment, for instance, if the address of a readable area of the original table 64 corresponds to that of a storage area on the image memory 7, the determination can be effected by recognizing the size of the original on the basis of the size of a data development area on the image memory 7 and by comparing its result with the sizes of bills and the like stored in advance in the ROM 2 and the like. In addition, this determination can also be effected by comparing the distribution of color spectra of the original with data registered in advance.

If the size of the original corresponds to the size of a bill or the like, the bill detecting means 9 outputs "1", and, if not, it outputs "0". If this output is "0" (Step S9), the CPU 1 outputs the image on the image memory 7 as a color image by means of the image output means 8 (Step S11). On the other hand, if the output is "1", the CPU 1 prohibits the outputting of an image (Step S13).

In the image outputting processing (Step S11), image formation is carried out on the basis of a known electrostatic process. In other words, after the photosensitive drum 86 is charged with the primary charger 81, the LED array 82 is turned on and off in correspondence with the image data in synchronism with the rotation of the photosensitive drum 86, thereby forming an electrostatic latent image. This electrostatic latent image is developed by the developing device 83 by means of a developer (toner or the like) and is transferred by the transfer charger 84 onto the copy paper 810 fed by the pickup roller 87. The output of a color image is realized by effecting the above-described process for each of yellow, magenta, cyan and black. Upon completion of development of the specified colors, the copy paper 810 is conveyed to the fixing rollers 88 by means of the conveyor belt 816 so as to effect thermal fixing and is then discharged onto the discharged paper tray 89.

On the other hand, in the processing in Step S13, the CPU 1 does not start the image output means 8, so that copying is prohibited and an output is not delivered. In other words, if the original is a bill or the like, the outputting of an image is prohibited. In addition, an arrangement may be provided such that display of a predetermined error message or an alarm using speech is provided in connection with this processing.

In order to ensure that the outputting of an image of the bill or the like is thus ultimately prohibited, in addition to prohibiting the operation of the image output means 8 as described above, the prohibition may be carried out before then. For instance, the scanning of the surface of the original is conducted four times, i.e., for each color, and if the feature of the original, such as the size of the original, becomes clear in that process, subsequent reading may be prohibited at that point of time, thereby prohibiting the outputting of an image.

In addition, an arrangement may be alternatively provided such that the outputting is prohibited after the copying operation by the image outputting means 8.

As described above in detail, in accordance with this embodiment, if a determination is made that the image is a specified one, the outputting of the image is prohibited, so that it is possible to prevent the forgery of a bill or the like.

Figure 5:
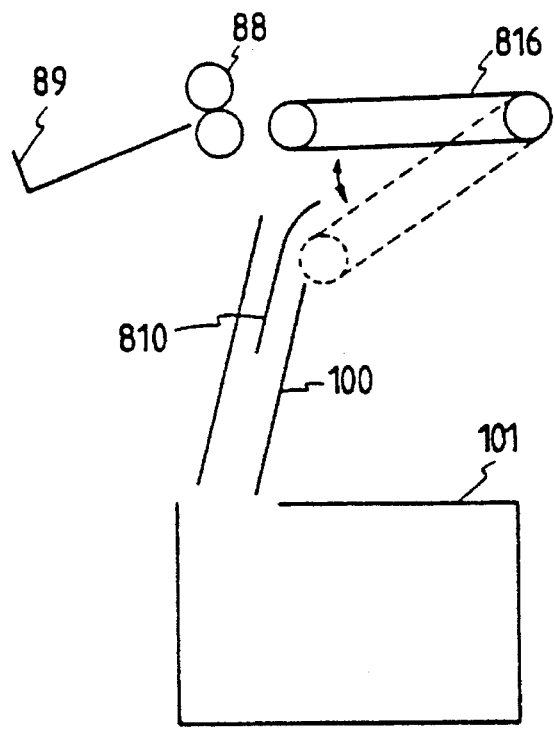
FIG. 5 is a schematic diagram of an essential part of means for prohibiting a copying output in accordance with a second embodiment.

FIG. 5 illustrates a second embodiment of the present invention for prohibiting the outputting after a copying operation. In this embodiment, the copy paper on which image formation is carried out once is not delivered to the outside, but is internally disposed of by cutting or the like.

FIG. 5 schematically illustrates an arrangement of an essential part of this embodiment. In this embodiment, regardless of the type of original, the process proceeds to the transfer of image onto the copy paper shown in FIG. 4. Then, if the output of the image detecting means 9 is "0", the conveyor belt 816 is set in the position indicated by the solid line in FIG. 5, and the copy paper 810 is conveyed by the conveyor belt 816 to the fixing rollers 88 where and the copy paper 810 is subjected to thermal fixing and then discharged onto the discharged-paper tray 89. Meanwhile, if the output of the image detecting means 9 is "1", i.e., if the original was a bill or the like, the conveyor belt 816 is set in the position indicated by the broken line in FIG. 5. Then, the copy paper 810 which has been fed passes through a guide 100 and is conveyed to a cutter 101 where it is disposed of by being cut into fine pieces, making it impossible to obtain an output of copying.

Accordingly, in accordance with this embodiment, before a reproduced image for forging is delivered outside the apparatus, the copy paper is disposed of, thereby making it possible to prevent the forging of a bill or the like.

In the foregoing embodiments, as a means of controlling the output of copying, the operation of the image output means 8 is prohibited, or the discharge thereof is prohibited. However, an arrangement may be provided such that the operation of the image output means 8 itself is controlled in such a manner that the copy of a bill or the like will be unusable.

Figure 6:
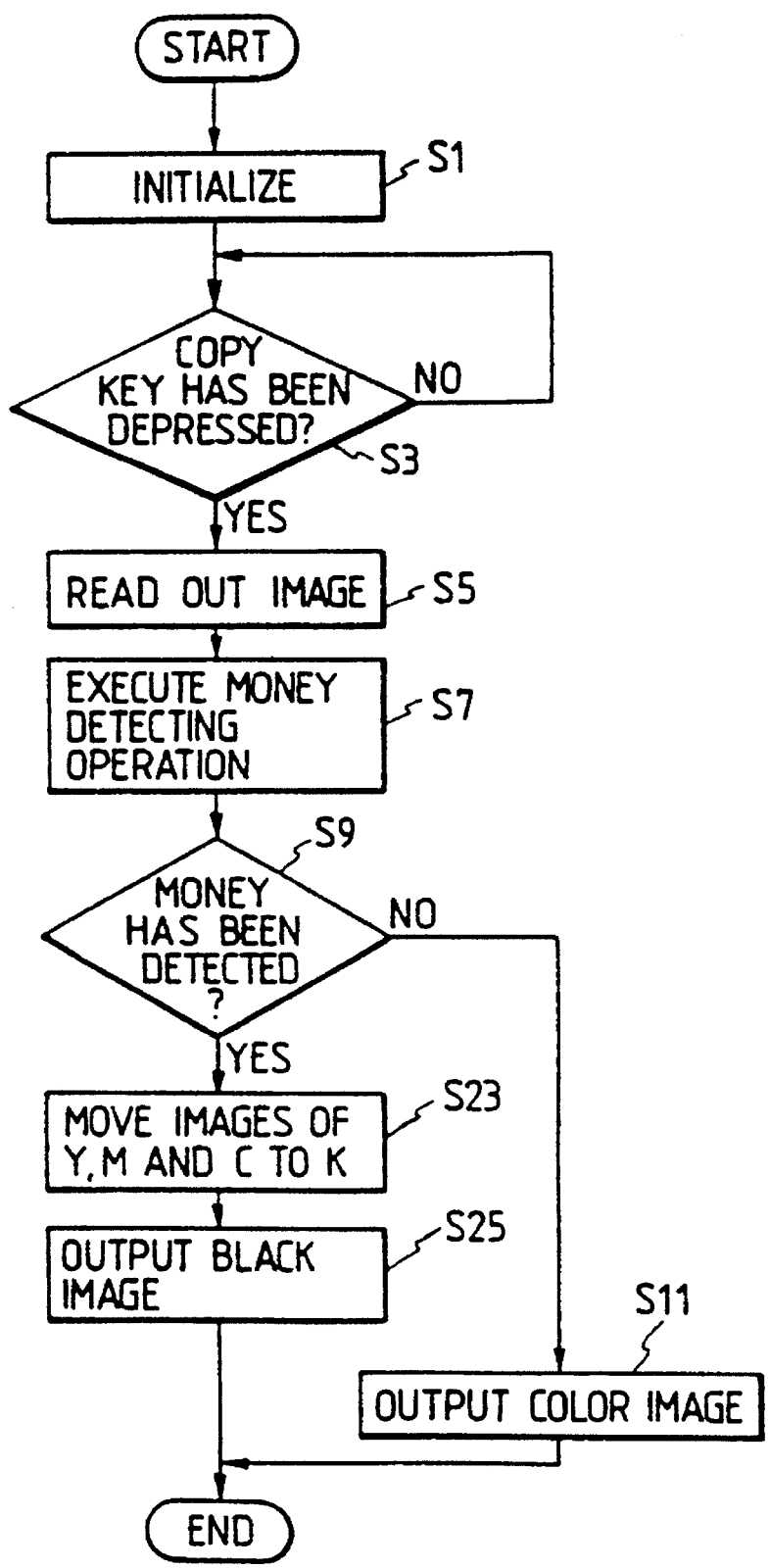
FIG. 6 is a flowchart illustrating an example of a control procedure in accordance with a third embodiment of the present invention.

FIG. 6 illustrates an example of a control procedure in accordance with a third embodiment of the present invention for making a copy of a bill or the like unusable.

In this embodiment, processing by means of Steps S23 and S25 is provided instead of Step S13 in FIG. 4.

In other words, if the bill detecting means 9 detects a bill, a stock or the like and outputs "1", the CPU 1 calculates a logical sum of images of yellow, magenta and cyan and an image of black, and converts the images of yellow, magenta and cyan to that of black (Step S23). Then, the CPU 1 outputs an image by the image output means 8 as a monochromatic image (Step S25). Thus, by outputting a monochromatic image, it becomes impossible for the operator who attempts to engage in a forging act to engage in the act by simply using a copying apparatus.

Although, in this embodiment, it is assumed that copying in black is effected as an output of a monochromatic image, it is also possible to effect monochromatic copying in yellow, magenta or cyan. More specifically, control of the image output means 8 in any form is possible insofar as it is ensured that at least a faithful full-color copy is not produced. In addition, if, when a bill or the like is detected before completion of the reading scanning described above, copying is effected with the contents stored in the memory 7 up until then, full-color copying will not be effected, so that this procedure is equally effective.

Although, in the foregoing embodiments, detection as to whether or not the original being copied is a bill or the like is conducted on the basis of a document size, it goes without saying that such detection may be effected by using any form of means.

For instance, means used in automatic vending machines and the like for reading a magnetic pattern of a part or the whole of a bill may be provided so as to compare that pattern with a pattern stored in advance. In this case, it is possible to provide an arrangement in which a magnetic head is provided in the original cover provided on the original table 64 for covering the original 69. Alternatively, in the case of a copying apparatus having an automatic delivery feeder (ADF) for originals, it is possible to adopt an arrangement in which a magnetic head is provided in its conveying passage.

In addition, it is also possible to adopt an arrangement in which a part or the whole of the image pattern of a bill or the like is read, and the read pattern is compared with a pattern which has been stored in advance. As for this reading, in the case of an apparatus having the configuration of a digital copier such as the one described above, the reading operation of the image reading means 6 may be used as it is. In the case of the other types of apparatus, the reading head may be provided on the original cover or conveying passage of an ADF or the like. Alternatively, the illumination means may be provided on the original cover, and a comparison may be effected by reading a watermark pattern.

The present invention can be applied irrespective of the form of the image output means 8. For instance, although an arrangement is adopted in which an LED array is used in the above-described embodiments so as to form an electrostatic latent image on the photosensitive drum, an arrangement may be alternatively adopted in which a laser beam or the like is used. Furthermore, the means of forming an electrostatic latent image on the photosensitive drum is not confined to such electrophotographic type, but various other types may be used.

As described above, in accordance with the third embodiment of the present invention, if an attempt is made to copy an object the copying of which is prohibited, such as a bill or a stock, detection of that fact is carried out, and an output of copying is controlled appropriately, making it impossible for the operator to effect the desired faithful but illegal copying. Thus, there is an advantage in that the act of forgery can be prevented.

Particularly in this embodiment, the color original is output by being converted into a monochrome image, it is possible to ascertain what the original image was like. In other words, when the operator's purpose in copying the stock is not forgery but, for instance, to preserve as a document, that object can be attained.

Figure 7:
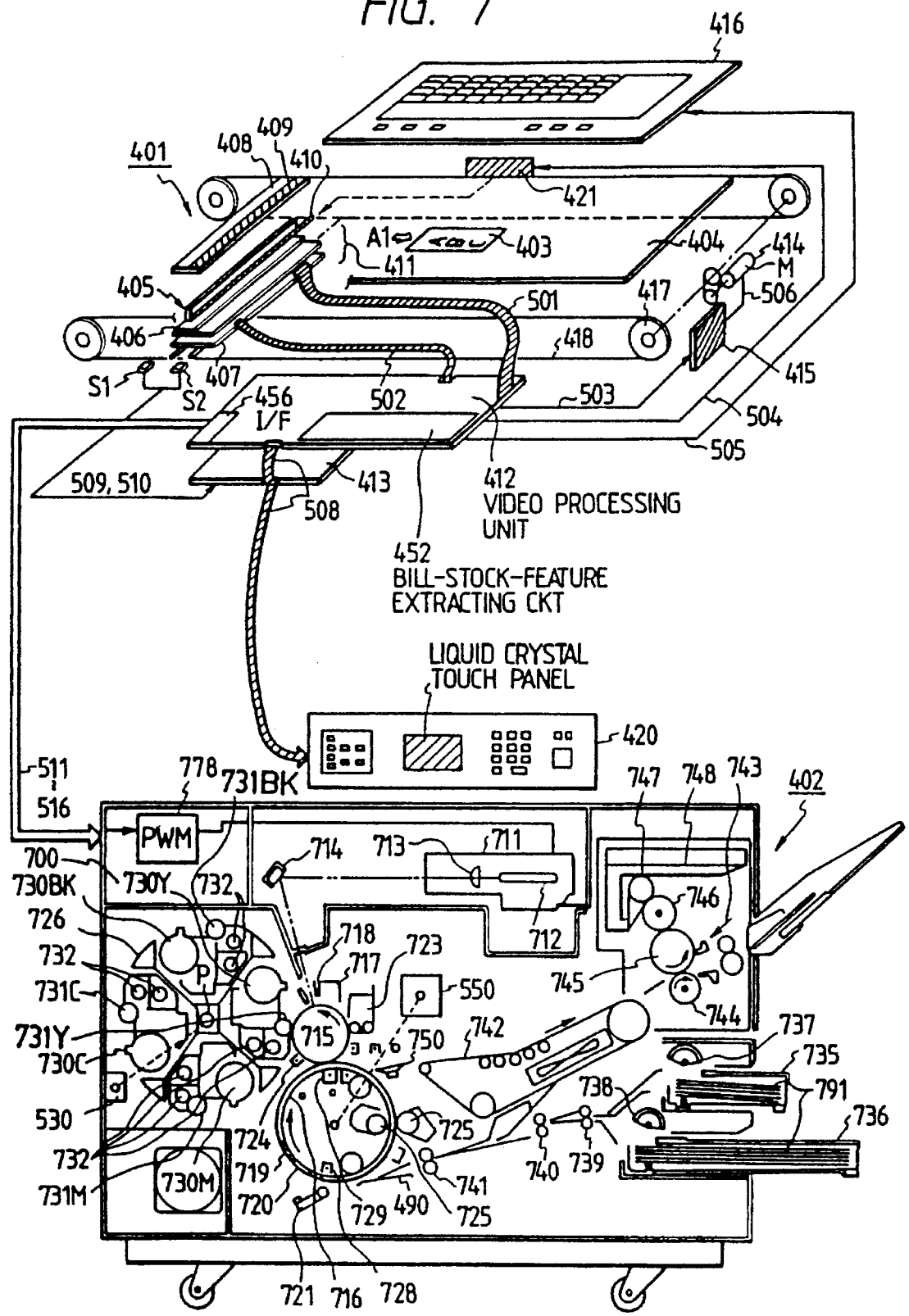
FIG. 7 is a diagram of an image processing apparatus in accordance with a fourth embodiment of the present invention.

FIG. 7 illustrates an example of a schematic internal structure of a digital color image processing system in accordance with a fourth embodiment of the invention. As illustrated in the drawing, this system comprises a digital color image reading unit (hereinafter referred to as a color reader) 401 provided in an upper portion thereof, and a digital color image printing unit (hereinafter referred to as a color printer) provided in a lower portion thereof. This color reader 401 is adapted to read the color image information of an original for each color by means of color separating means, which will be described later, and a photoelectric conversion element such as a CCD, and to convert the same into electrical digital image signals. The color printer 402 is a laser beam color printer for effecting recording by reproducing a color image for each color in response to those digital image signals and by transferring them onto the recording medium a plurality of times in the form of digital dots.

First, an outline of the color reader 401 will be described. An original is designated at 403, and platen glass 404 is for placing the original thereon. A rod lens array 405 is adapted to condense a reflected image from the original subjected to exposure scanning and to input the image into an equal-magnification-type full color sensor 406, components 405, 406, 407 and 410 effecting exposure scanning in the direction of the arrow A1 integrally as an original scanning unit 411. Color-separated image signals read for each line during the exposure scanning are amplified to a predetermined voltage by a sensor output signal amplifying circuit 407, and are then input to a video processing unit 412, which will be described later, by means of a signal line 501 so as to be subjected to signal processing. A detailed description of this arrangement will be given later. It should be noted that the signal line 501 is made into a coaxial cable so as to ensure faithful transmission of signals.

A signal line 502 is for supplying a drive pulse for driving the equal magnification-type full color sensor 406, and all the necessary drive pulses are generated in the video processing unit 412. A white plate 408 and a black plate 409 are used for correcting the white level of video signals and for correcting the black level thereof. If the white plate 408 and the black plate 409 are illuminated with a halogen exposure lamp 410, signal levels of the predetermined densities are respectively obtained and can be used for correcting the white level and the black level of the video signals.

A control unit 413 incorporating a microcomputer carries out all of the following control of the color reader 401: display at an operating panel 420 via a bus 508; control of key input via digitizer 416, control of the video processing unit, and control of a bill-stock-feature extracting circuit 452; detection by position sensors S1, S2 of the position of the original scanning unit 411 via signal lines 509, 510; control via a signal line 503 of a stepping motor drive circuit 415 for effecting the pulse driving of a stepping motor 414 via line 506 for moving the scanning unit 411 by means of pulleys 417 and cables 418; the ON/OFF control of the halogen exposure lamp 410 by an exposure lamp driver 421 via a signal line 504; control of the amount of light; and control of digitizer 416 via a signal line 505, an internal key, and a display unit, etc.

A color image signal read by the aforementioned exposure scanning unit 411 during the exposure scanning of the original is input to the video processing unit 412 from the amplification circuit 407 via the signal line 501. The color image signal is then provided with various types of processing to be described later inside the video processing unit 412, and is transmitted to the color printer 402 via an interface circuit 456 (communication between video processing unit 412 and printer 402 is carried out via signals 511 to 516).

A description will now be given of an outline of the color printer 402. A scanner is designated at 711 and has a laser output portion for converting a video signal from the color reader 401 into an optical signal (received at PWM circuit 778 in housing 700), a polygonal mirror 712 having the shape of a polyhedron (e.g., octahedron), a motor for rotating this mirror 712, an f/θ lens (image-forming lens) 713, etc. A reflection mirror 714 is adapted to change the optical path of a laser beam, and a photosensitive drum is designated at 715. A laser beam made emergent from a laser output portion is reflected by the polygonal mirror 712, is transmitted through the lens 713 and the mirror 714, and is made to linearly scan (raster scan) the surface of the photosensitive drum 715, thereby forming a latent image corresponding to the image of the original.

In addition, reference numeral 717 denotes a primary charger; 718, a whole image exposure lamp; 723, a cleaner section for recovering residual toner which was not transferred; and 724, a pre-transfer charger, all of these components being provided around the photosensitive drum 715.

A developing unit 726 is adapted to develop an electrostatic latent image formed on the surface of the photosensitive drum 715 by the laser exposure. Development sleeves 731Y, 731M, 731C, 731Bk directly effect development in contact with the photosensitive drum 715. Toner hoppers 730Y, 730M, 730C, 730Bk are designed to retain reserve toner. Screws 732 are adapted to transfer the developer. These sleeves 731Y-731Bk, toner hoppers 730Y-730Bk, and screws 732 constitute the developing unit 726, and these components are disposed around a rotary shaft P of the developing unit 726. When, for instance, a toner image of yellow is formed, the yellow toner development is carried out at the position shown in the drawing. At the time of forming a toner image of magenta, the developing unit 726 is rotated with the shaft P as a center, and the development sleeve 731M within a magenta developing unit is disposed at the position at which it is brought into contact with the photosensitive drum 715. The development in cyan and black is also effected in a similar manner.

In addition, a transfer drum 716 is designed to transfer a toner image formed on the photosensitive drum 715 onto the copy paper 791. An actuator plate 719 is adapted to detect the moving position of the transfer drum 716. A home position sensor 721 is adapted to detect the movement of the transfer drum 716 to a home position as the transfer drum 716 is brought into proximity with this actuator plate 719. Reference numeral 725 denotes a transfer drum cleaner; 728, a de-electrificator; and 729, a transfer charger. These members 719, 720, 725, 729 are disposed around the transfer drum 716.

Meanwhile, paper feeding cassettes 735, 736 are used for accommodating copy paper serving as a recording medium. Paper feeding rollers 737, 738 are adapted to feed copy paper from the cassettes 735, 736. Timing rollers 739, 740, 741 are adapted to time the paper feeding and conveyance. The paper fed and conveyed via these components is introduced into a paper guide 490, is wound around the transfer drum 716 with its leading edge held by a gripper, and is then moved by rotation of drum 716 to an image transfer location.

A drum rotating motor 550 is adapted to synchronously rotate the photosensitive drum 715 and the transfer drum 716. A releasing claw 750 is adapted to remove the paper from the transfer drum 716 after completion of the image forming process. A conveyor belt 742 is adapted to convey the removed paper. An image fixing unit 743 fixes the paper which has been conveyed by the conveyor belt 742 and has a pair of heat pressure rollers 744, 745 (other conventional elements 746 to 748 are also shown).

A printer controller to control the various parts of the printer 402 has a PWM circuit 778 for effecting pulse width modulation of the image information transferred from the reader 401 and then supplying the same to the scanner 711.

Figure 8:
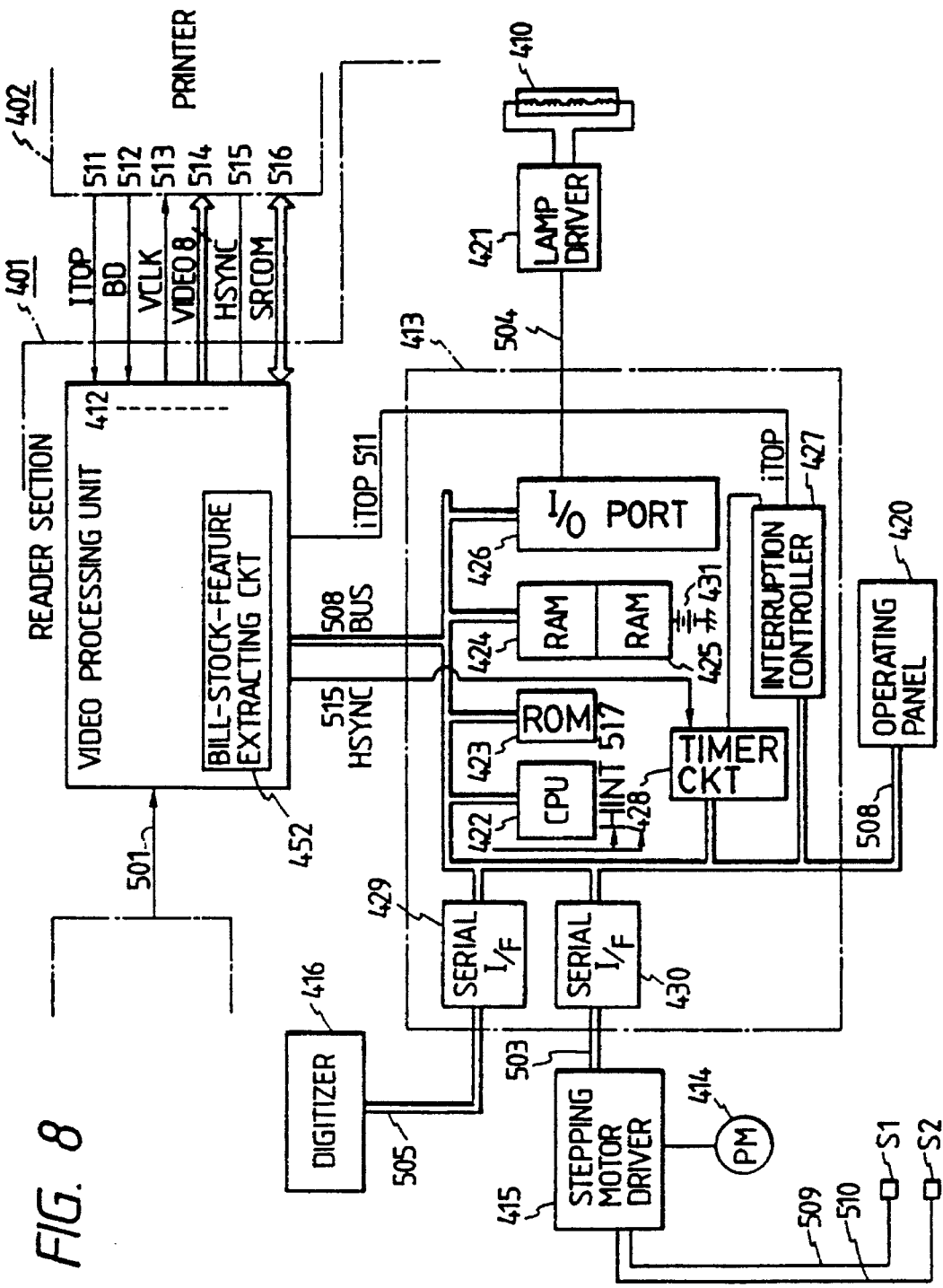
FIG. 8 is a block diagram illustrating an example of the arrangement of a control unit provided in a reader unit thereof.

Referring now to FIG. 8, a detailed description will be given of the control unit 413 of the reader 401 in accordance with the present invention.

(Control Unit)

The control unit 413 comprises a CPU 422 in the form of a microcomputer and organically effects control of video signal processing, as well as control of the lamp driver 421 (via I/O port 426) for exposure and scanning, the stepping motor driver 415, the digitizer 416, and the operating panel 420 via the signal lines 508 (bus), 504, 503, 505, etc., respectively, in correspondence of the contents stored in a program ROM 423, a RAM 424, and a RAM 425. Incidentally, as for the RAM 425, it is assumed that non-volatility is assured by a battery 431. A signal line 505 is for serial communication which is generally used, and the operator inputs necessary data on the basis of a protocol between the CPU 422 and the digitizer 416. Namely, the signal line 505 is one for inputting data for editing the original, such as coordinates at the time of movement, synthesis, and the like, designation of an area, designation of a copy mode, designation of a magnification, etc. The signal line 503 is one whereby the CPU 422 gives commands on the scanning speed, distance, forward movement, backward movement, etc., to the motor driver 415. Upon receipt of a command from the CPU 422, the motor driver 415 outputs predetermined pulses to the stepping motor 414, thereby rotating the motor 414. Serial interfaces (I/Fs) 429, 430 are generally used, e.g., ones which are realized by LSIs for serial I/Fs such as 8251 by Intel Corporation. The digitizer 416 and the motor driver 415 are provided with similar circuits (not shown).

In addition, sensors S1, S2 are used to detect the position of the original exposure scanning unit (designated at 411 in FIG. 7), S1 representing the home position in which the white level correction of image signals is effected. The sensor S2 detects the fact that the original exposure scanning unit is located at the tip of the image, and this position serves as a reference position of the original.

(Printer Interface)

Signals ITOP, BD, VCLK, VIDEO, HSYNC, SRCOM (511–516) are respectively interface signals between the color printer 402 and the reader 401 shown in FIG. 7. All the video signals VIDEO 514 read by the reader 401 are transmitted to the color printer 402 on the basis of the aforementioned signals. ITOP 511 is a synchronous signal in the image feeding direction (hereinafter referred to as the subscanning direction). This synchronous signal is produced once for each transmission of the four colors (yellow, magenta, cyan, and black), i.e., a total of four times on each such occasion. This signal is made synchronous with the rotation of the transfer drum 716 and the photosensitive drum 715 so as to be aligned with the image at the tip of the original when the toner image is transferred onto the copy paper wound around the transfer drum 716 of the color printer 402, at a point of contact with the photosensitive drum 715. This signal 511 is transmitted to the video processing unit disposed in the reader 401 and is output as an interruption of the CPU 422 in the controller 413 (via interruption controller 427).

The CPU 422 controls images in the subscanning direction for editing or the like by using ITOP interruption as a reference. BD 512 is a synchronous signal in the raster scanning direction (hereinafter referred to as the main scanning direction) which is produced once during one rotation of the polygonal mirror 712, i.e., once during one raster scanning. The image signals read by the reader 401 are transmitted to the printer 402 one line at a time in the main scanning direction in synchronism with the signal BD 512. VCLK 513 is a synchronous clock for transmitting the digital VIDEO signal 514 of 8 bits to the color printer 402, and allows the VIDEO signal 514 to be sent via flip-flops 332, 335 (shown with buffer amplifiers 333, 334, 336, 337), as shown in FIG. 9B.

HSYNC 515 is a synchronous signal in the main scanning direction which is produced in synchronism with VCLK 513, and has the same period as the signal BD 512. Strictly speaking, the VIDEO signal 514 is transmitted in synchronism with HSYNC 515. This arrangement is adopted because, since the signal BD 512, which is produced in synchronism with the rotation of the polygonal mirror 712, contains in large amounts the jitter of the motor for rotating the polygonal mirror 712, if the VIDEO signal 514 is synchronized with the BD signal as it is, jitter would occur in the image, so that HSYNC 515 is required which is produced in synchronism with jitter-free VCLK on the basis of the BD signal.

SRCOM is a signal line for semi-double bilateral serial communication. As shown in FIG. 9C, a command CM is transmitted in synchronism with an 8-bit serial clock SCLK during the transmission of a synchronous signal CBUSY (command busy) sent from the reader. In response, a status signal ST is returned in synchronism with an 8-bit serial clock occurring during the transmission of SBUSY (status busy) sent from the printer. All the exchanges of information including commands from the reader to the printer, such as the color mode and the selection of a cassette, information on the status of the printer, such as jamming, paper shortage, wait, etc., are conducted via this communication line SRCOM.

Figure 9A:
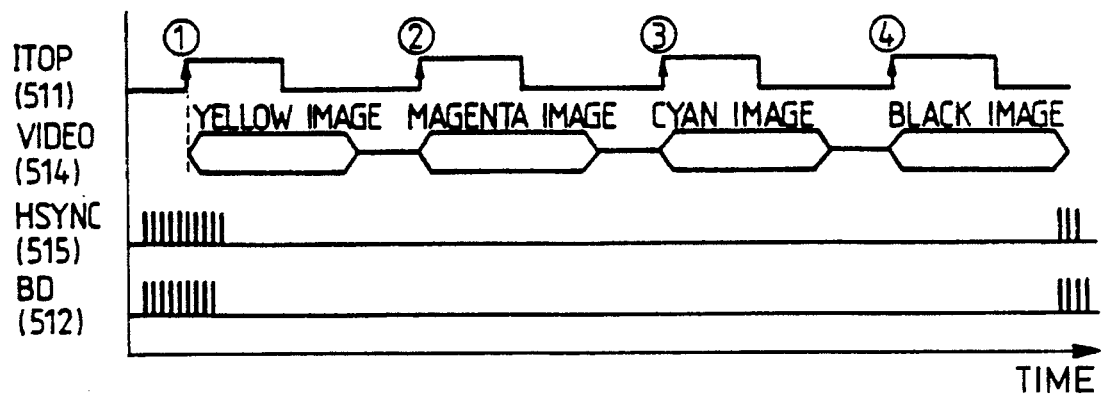
FIGS. 9A, 9B, and 9C are timing charts illustrating the operation of the control unit.
Figure 9B:
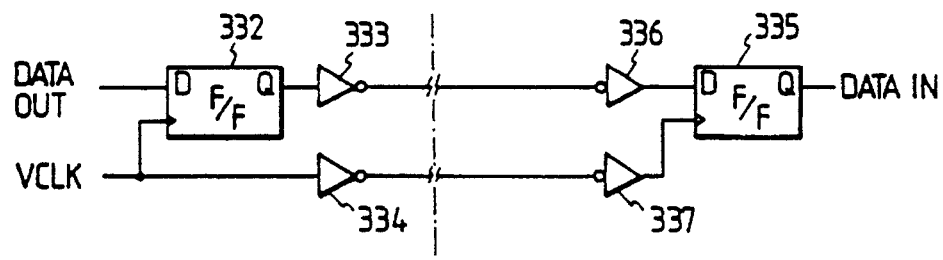
Figure 9C:
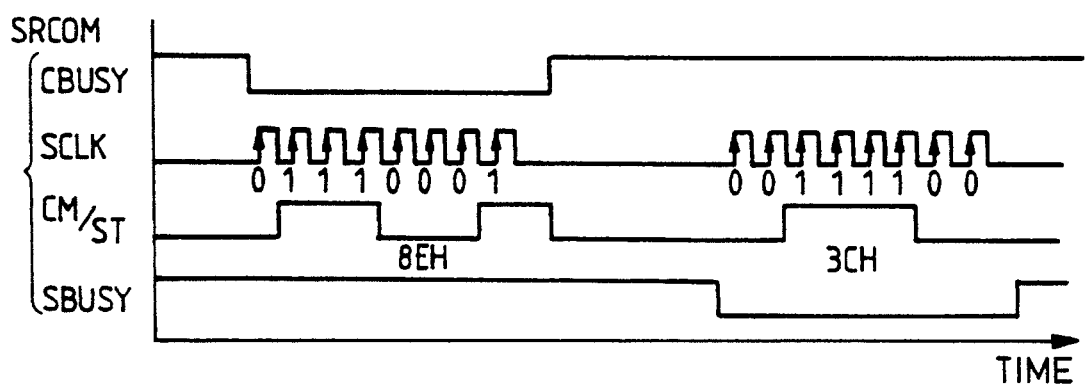

FIG. 9A shows a timing chart for transmitting one four-color (full-color) image on the basis of ITOP and HSYNC. ITOP 511 is produced once during one rotation or two rotations of the transfer drum 716. At a timing ①, data of a yellow image is transmitted from the reader 401 to the printer 402. Similarly, data of a magenta image is transmitted at a timing ②, that of a cyan image at a timing ③, and that of a black image at a timing ④. Thus, a full-color image is formed on the copy paper with four colors superposed thereon. If, for instance, the image density in the feeding direction is assumed to be 16 pel/mm with respect to 420 mm in the longitudinal direction of an A3-size image HSYNC is transmitted 420×16=6,720 times. At the same time, this signal is output to a clock input for a timer circuit 428 provided in the controller circuit 413, which is adapted to supply an interruption HINT 517 to the CPU 422 after the lapse of a predetermined count. Thus, the CPU 422 effects image control in the feeding direction, such as withdrawal and movement.

(Bill-Stock-Feature Extracting Circuit)

Figure 10:
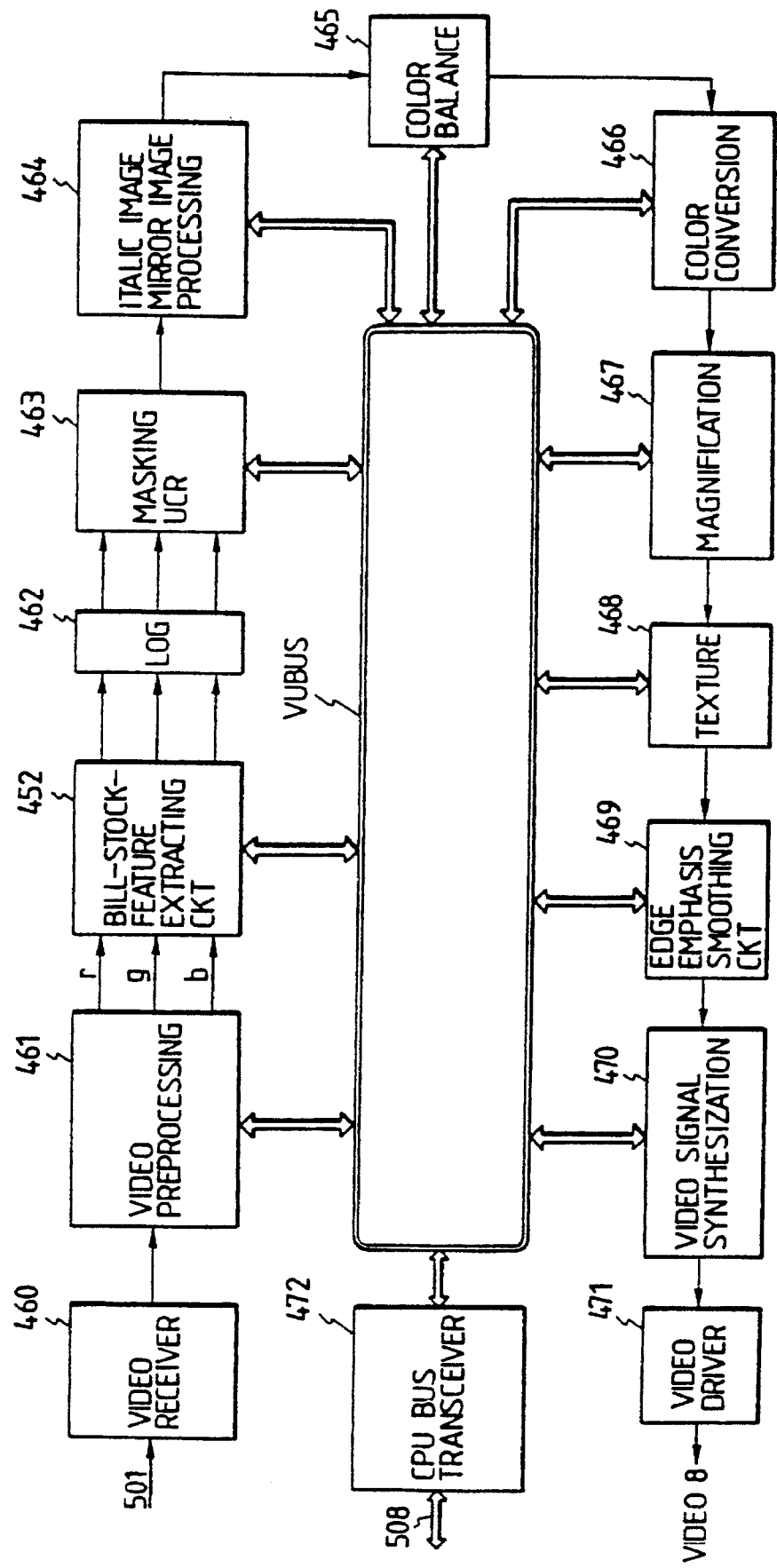
FIG. 10 is a block diagram illustrating an example of the arrangement of a bill-stock recognizing circuit.

Referring now to FIG. 10, a description will be given of the operation of a bill-stock-feature extracting circuit 452.

FIG. 10 is a block diagram illustrating an example of the configuration of the video processing unit 412 including the bill-stock-feature extracting circuit 452. The color image signal read by the exposure scanning unit 411 shown in FIG. 7 is input from an amplification circuit 407 to the video processing unit 412 via the signal line 501. In this video processing unit 412, that input is received by a video receiver circuit 460, and the misregistration of each color and shading are corrected by a video preprocessing circuit 461 so as to output r, g, b signals.

The preprocessed video signal is input to the bill-stock-feature extracting circuit 452, and after being converted from a luminance signal into a density signal by a LOG conversion circuit 462, the signal is subjected to masking and under-color removal (UCR) by a masking/UCR circuit 463. Then, the signal is transmitted to the color printer 402 via the following: an italic image/mirror image processing circuit 464, a color balance circuit 465, a color conversion circuit 466, a magnification conversion circuit 467, a texture processing circuit 468, an edge emphasis smoothing circuit 469, a video signal synthesization circuit 470, and a video driver circuit 471, and then via a signal line VIDEO 8.

The processing circuits provided in the video processing unit 412 are connected to each other via an internal bus VUBUS and are further connected to the CPU 422 via a CPU bus transceiver 472 and a signal line 508.

In the bill-stock-feature extracting circuit 452, on the basis of the r, g, b signals that are input into it, a determination is made as to whether or not the input data matches with the features of a predetermined bill or stock, and a determining result thereof is returned to the CPU 422 via the VUBUS.

On the basis of a determining result with respect to a number of features, the CPU 422 makes a final determination as to whether or not the original being examined is a bill or stock. If the answer is YES, the CPU 422 sets a conversion parameter for a specific processing circuit via the VUBUS, the parameter being such that it will not allow a faithful image of the original to be reproduced.

As for the processing of a determination on the matching effected by the bill-stock-feature extracting circuit 452, the determination may be made with respect to the input signals r, g, and b by making a comparison with data on the distribution of color spectra of the original registered in advance in a ROM or the like, or by comparing a pattern of a part or the whole of the image of the original with pattern data registered in advance, or effecting such processings in combination. In addition to the extraction of features with respect to the contents of the image data that has been read, it is possible to provide other appropriate processing such as addition of a circuit or the like for determining the size, magnetic pattern, watermark pattern or the like of the original and to transmit such data to the CPU 422.

Figure 11:
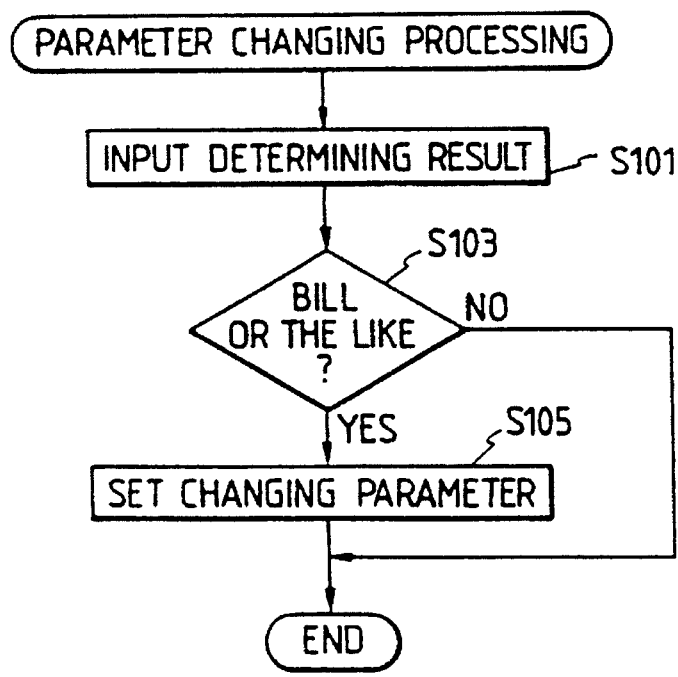
FIG. 11 is a flowchart illustrating an example of an image change processing procedure on the basis of the result of recognition.

FIG. 11 shows an example of parameter changing processing which is carried out by the CPU 422 on the basis of a determination on a number of features obtained from the above-described feature extracting circuit 452. This procedure can be stored in the ROM 423.

First, in Step S101, various results of determination are input from the aforementioned circuit 452 and others. Then, a final determination is made on the basis of the input results as to whether or not the original being examined is a bill or a stock (Step 5103). In accordance with that calculated result, a changing parameter is set in the processing circuit 463 and the like in Step S105.

A description will now be given of examples of implementing the details of parameter changing.

The following formulas (a) to (d) are examples of changing the color when a determination is made that the original being examined is a bill or a stock, and this processing is carried out by changing the parameters of masking and UCR with respect to the masking/UCR processing circuit 463.

$$\begin{pmatrix} Y' \\ M' \\ C' \\ Bk' \end{pmatrix} = \begin{pmatrix} m_{11} & m_{12} & m_{13} \\ m_{21} & m_{22} & m_{23} \\ m_{31} & m_{32} & m_{33} \\ m_{41} & m_{42} & m_{43} \end{pmatrix} \begin{pmatrix} Y \\ M \\ C \end{pmatrix} \quad (a)$$

$$\begin{pmatrix} Y' \\ M' \\ C' \\ Bk' \end{pmatrix} = \begin{pmatrix} m_{21} & m_{22} & m_{23} \\ m_{31} & m_{32} & m_{33} \\ m_{41} & m_{42} & m_{43} \\ m_{11} & m_{12} & m_{13} \end{pmatrix} \begin{pmatrix} Y \\ M \\ C \end{pmatrix} \quad (b)$$

$$\begin{pmatrix} Y' \\ M' \\ C' \\ Bk' \end{pmatrix} = \begin{pmatrix} 0 & 0 & 0 \\ 0.2 & 0.4 & 0.4 \\ 0 & 0 & 0 \\ 0 & 0 & 0 \end{pmatrix} \begin{pmatrix} Y \\ M \\ C \end{pmatrix} \quad (c)$$

$$\begin{pmatrix} Y' \\ M' \\ C' \\ Bk' \end{pmatrix} = \begin{pmatrix} 0 & 0 & 0 \\ 0 & 0 & 0 \\ 0 & 0 & 0 \\ 0.3 & 0.5 & 0.2 \end{pmatrix} \begin{pmatrix} Y \\ M \\ C \end{pmatrix} \quad (d)$$

Formula (a) is an example of usual masking, whereas, if the matrix [$m_{ij}$] is changed into that shown in formula (b), the color changes totally from that of the original, so that the recorded image cannot be used as a circulatable one as a bill or a stock. However, the contents of the stock can be recorded.

In addition, formula (c) is an example in which the image is printed in a specified color, while formula (d) is an example in which the image is printed in black.

As described above, in accordance with this embodiment, even in the case where it is determined that the original is a bill or a stock, it is possible to produce a copy although it is not faithful to the original, but sufficient to ascertain the contents described therein. Thus, it is possible to preserve the contents of the stock as a record.

Figure 12:
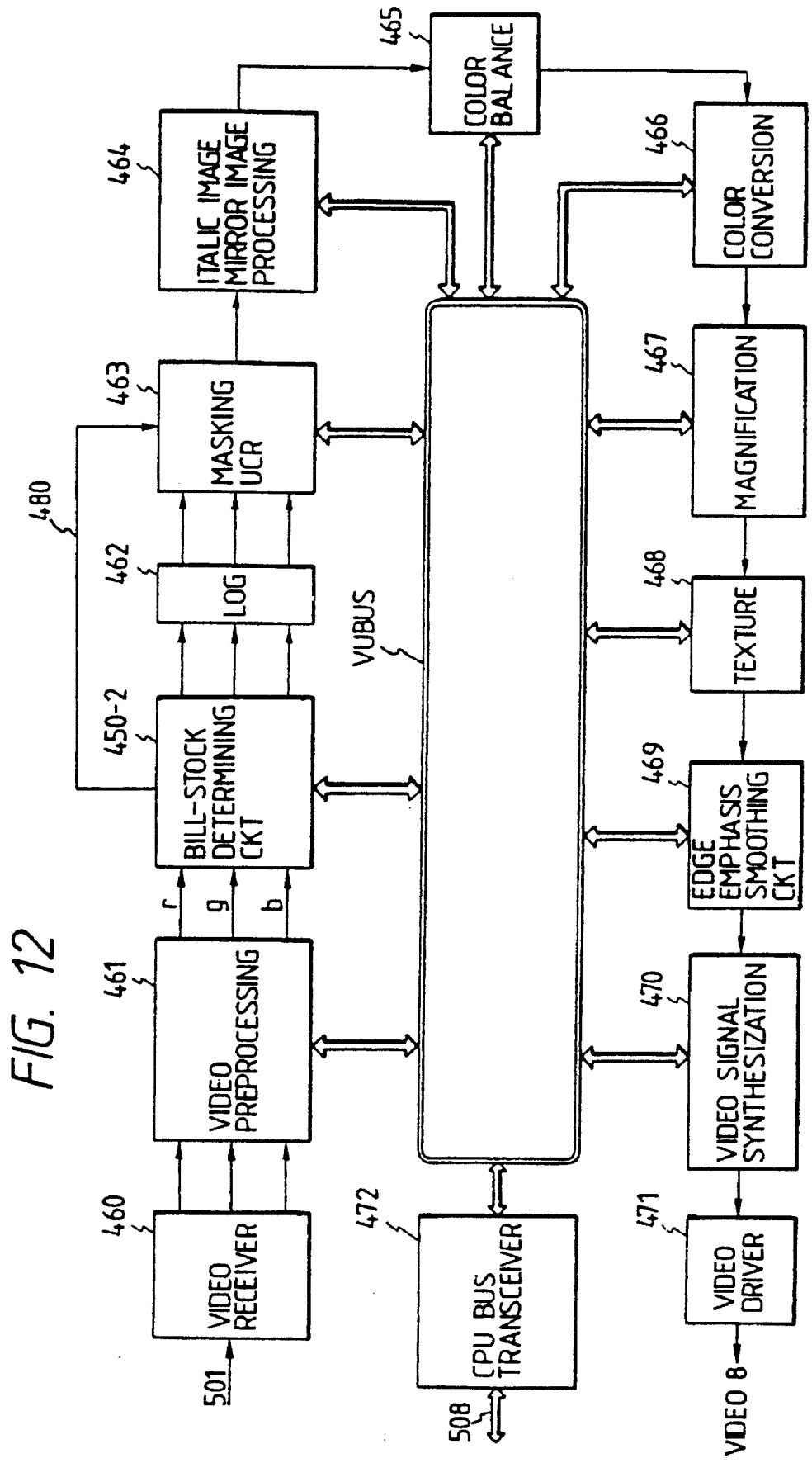
FIG. 12 is a block diagram illustrating the arrangement of a bill-stock recognizing circuit in accordance with a fifth embodiment.

FIG. 12 illustrates a fifth embodiment of the present invention. In the drawing, reference numeral 450-2 denotes a bill-stock determining circuit, and in this example a CPU is provided so as to effect control in correspondence with the determination of a bill or the like. A logarithmic circuit 462 transforms the output of circuit 450-2 before providing the latter to masking circuit 463.

A signal 480 is adapted to control a color which is output to the masking/UCR processing circuit. The other functions are identical to those shown in FIG. 10.

Figure 13:
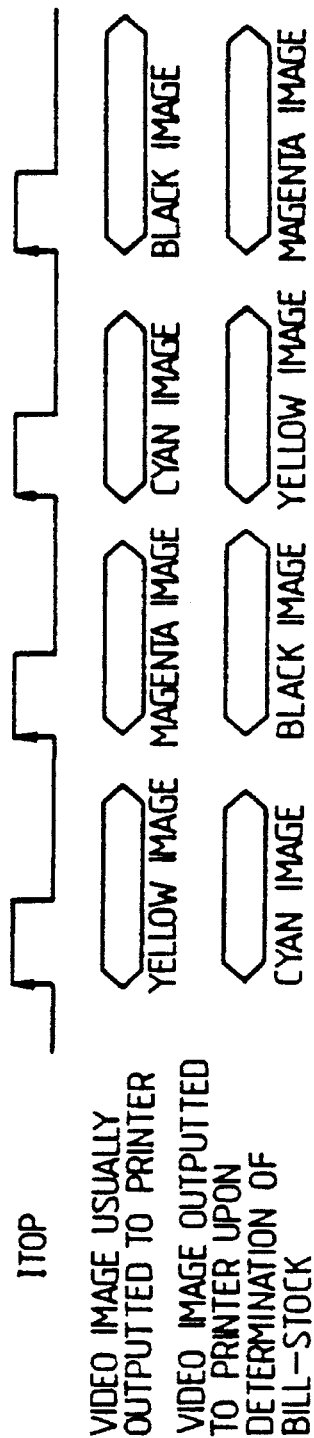
FIG. 13 is a diagram illustrating the form of image change on the basis of the arrangement shown in FIG. 12.

In the case where a usual copying operation is carried out, as shown at (a) in FIG. 13, the masking/UCR processing circuit 463 is controlled in such a manner that VIDEO 8 is changed over in the order of yellow, magenta, cyan, and black in synchronism with the iTOP signal output from the printer 402. When it is determined in the bill-stock determining circuit 450-2 that the original is a bill or a stock, the color of the printed image is changed by changing the order of the changing over of the colors, as shown at (b) in FIG. 13.

Thus, since the masking/UCR processing circuit is controlled directly from the bill-stock determining circuit 450-2, it is possible to effect processing for changing the color independently of the CPU 422, so that the program of the CPU 422 does not become complicated, and, even if the program of the CPU 422 is altered, the prevention of forgery can be effected more positively.

Figure 14:
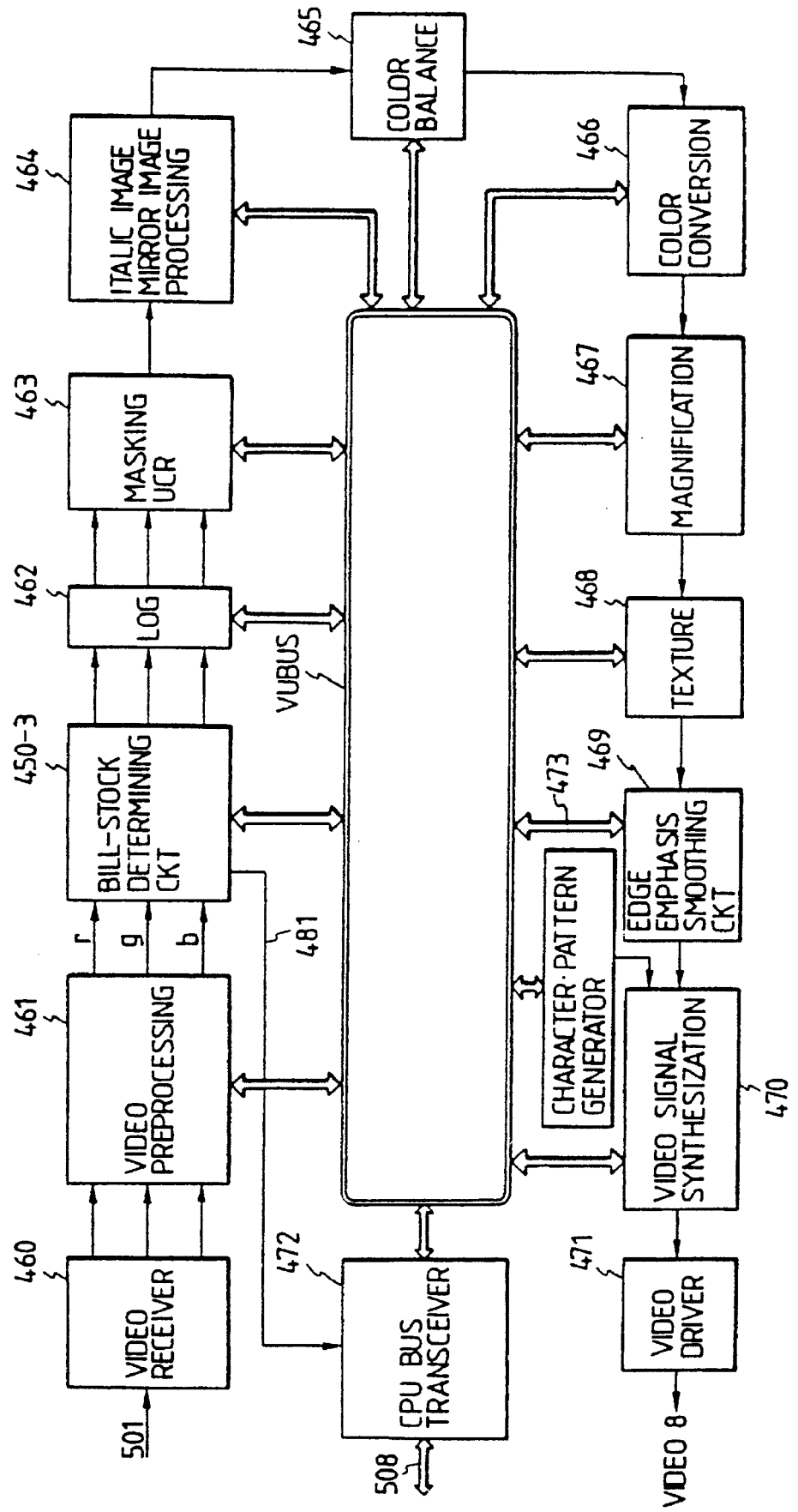
FIG. 14 is a block diagram illustrating an example of the arrangement of a bill-stock recognizing circuit in accordance with a sixth embodiment.

FIG. 14 illustrates a sixth embodiment of the present invention.

In the drawing, a bus changeover signal 481 is adapted to control a bus transceiver 472 for the CPU bus 508, and a bill-stock determining circuit 450-3 operates independently of the CPU 422, constantly monitoring the video signals r, g, b. If a determination is made that the original is a bill or a stock, the CPU bus transceiver 472 is closed to exclusively use the VUBUS, and if, for instance, a specific parameter is written in the italic image/mirror image processing circuit 464, it is possible to print an italic image, as shown at (a) in FIG. 15.

If such a conversion is carried out forcedly, a printed image which can be distinguished clearly from an authentic one is output, thereby making it possible to prevent forgery.

Figure 15:
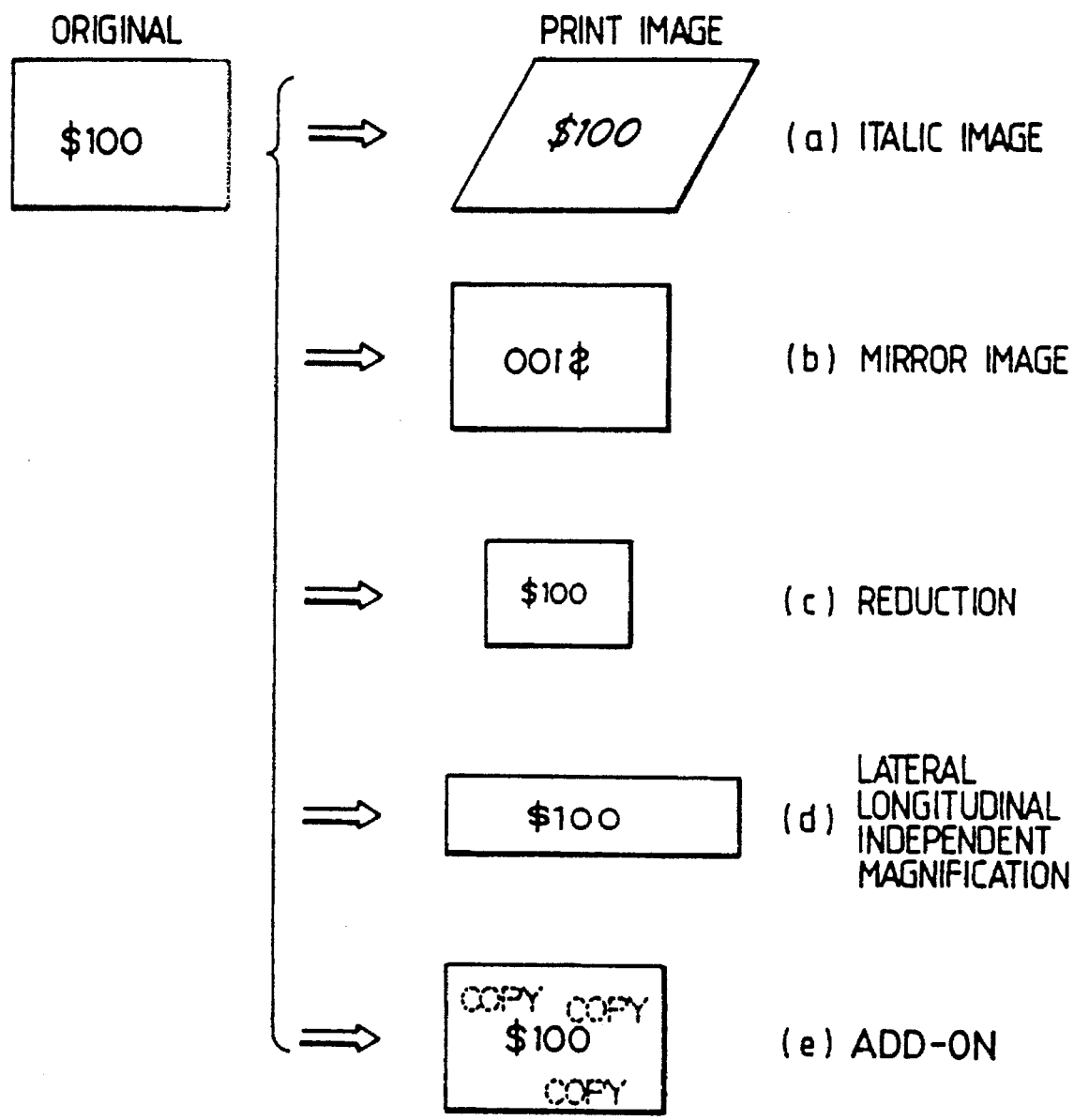
FIG. 15 is a diagram illustrating the form of image change on the basis of the arrangement shown in FIG. 14.

FIGS. 15 (b)–(c) are other examples in which mirror images are output by controlling the italic image/mirror image processing circuit 464, in which (c) is an example in which an output is delivered in reduced form by controlling the magnification processing circuit 467, (d) is an example in which an output is delivered by through lateral longitudinal independent magnification by controlling the magnification processing circuit 467, and (e) is an example in which an output is delivered by adding on the characters "copy" by controlling the video signal synthesization circuit 470 and a character-pattern generator 473.

In addition, the color balance may be changed substantially by controlling the color balance processing circuit 465. Alternatively, an image may be output in a specific color (monochrome) by controlling the color conversion circuit 466, or a monotone image may be output by controlling the color conversion circuit 466. Furthermore, an image may be output in the form of mosaic texture by controlling the texture processing circuit 468, or fine lines may be deleted through filtering, or blurring processing may be effected by controlling the edge emphasis smoothing processing circuit 469. Moreover, an image may be output by being subjected to negative-positive conversion by controlling the LOG conversion circuit 462.

Since the arrangement is provided such that processing for forgery prevention is carried out in the video processing unit 412, it is possible to assure forgery prevention more positively.

Figure 16:
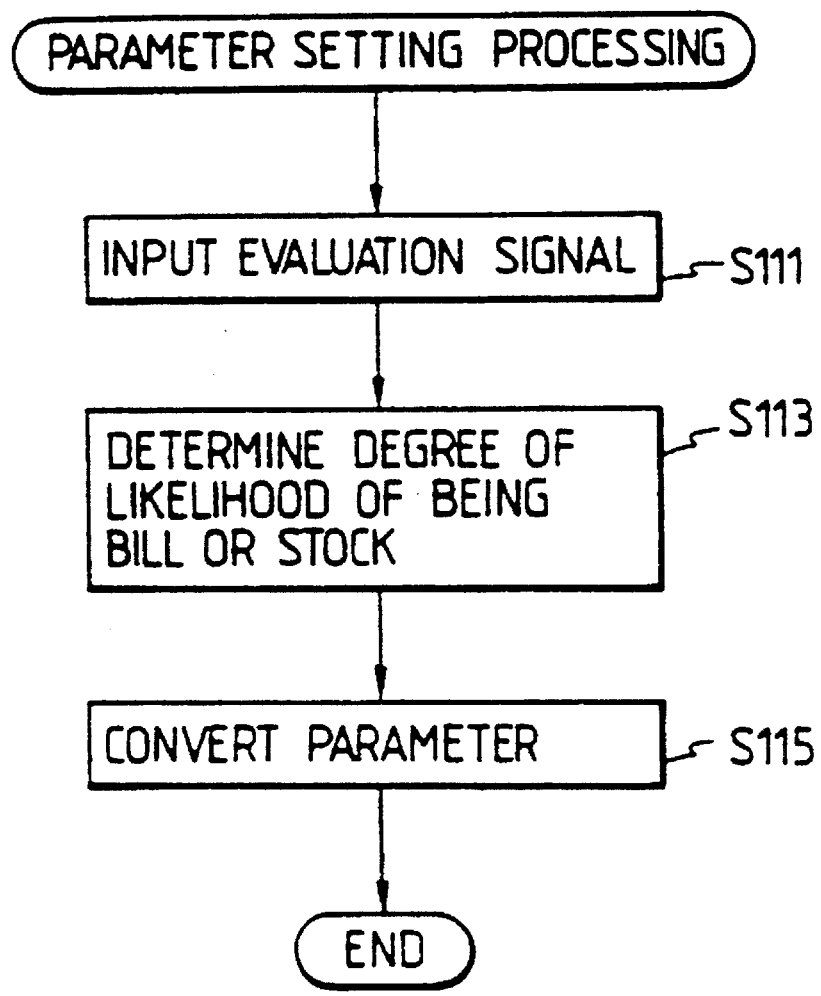
FIG. 16 is a flowchart illustrating an example of an image change processing procedure on the basis of the result of recognition in accordance with a seventh embodiment.

FIG. 16 is a diagram illustrating a seventh embodiment of the present invention.

In this embodiment, in the feature extracting circuit 452, the CPU 422 calculates the degree of the "likelihood of being a bill or a stock", and sets a conversion parameter for a specific processing circuit in correspondence with the degree of the "likelihood of being a bill or a stock".

Since the processing of a matching determination carried out by the feature extracting circuit 452 is identical with that shown in FIG. 7, a description thereof will be omitted.

Specifically, FIG. 16 illustrates an example of a parameter conversion processing procedure carried out by the CPU 422 on the basis of a number of evaluations obtained from the above-described feature extracting circuit 452. This procedure can be stored in the ROM 423.

First, in Step S111, various evaluations (determining results) are input from the aforementioned circuit 452 and others. Then, in Step S113, an appropriate calculation is performed on the basis of the evaluations, and a determination is made on the degree or extent of the "likelihood of being a bill or a stock certificate " (the evaluations constitute an array which may be simply a collection of numbers used in actual computations, or the array may be used to address the contents of a look-up table in ROM 423, and this array is sometimes hereinafter termed a "non-binary-number" to indicate that it could be anything ranging from a collection of several numbers, to a single value chosen on a (non-binary) scale, to an array of several different types of values). In Step S115, conversion parameters are determined in correspondence with that calculated result, and are set in the processing circuit 463 or the like. Not only the aforementioned degree or extent evaluations but also the conversion parameters can be formatted in advance as tables in the ROM 423.

A description will now be given of an example of the contents of parameters to be converted.

The following formulae (e) and (f) are examples in which the color is changed in correspondence with the degree of the likelihood of being a bill or a stock certificate, and this processing is effected by changing masking/UCR parameters for the masking/UCR processing circuit 463.

$$\begin{pmatrix} Y \\ M \\ C \\ B \end{pmatrix} = \begin{pmatrix} m_{11} \, m_{12} \, m_{13} \\ m_{21} \, m_{22} \, m_{23} \\ m_{31} \, m_{32} \, m_{33} \\ m_{41} \, m_{42} \, m_{43} \end{pmatrix} \begin{pmatrix} Y \\ M \\ C \end{pmatrix} \quad (e)$$

$$\begin{pmatrix} Y' \\ M' \\ C' \\ Bk' \end{pmatrix} = \begin{pmatrix} (m_{11}-\alpha), (m_{12}+\alpha), m_{13} \\ m_{21}, (m_{22}-\alpha), (m_{23}+\alpha) \\ (m_{31}+\alpha), m_{32}, (m_{33}-\alpha) \\ m_{41}, m_{42}, m_{43} \end{pmatrix} \begin{pmatrix} Y \\ M \\ C \end{pmatrix} \quad (f)$$

Formula (e) is an example of usual masking, and if matrix $[m_{ij}]$ is changed into that shown in formula (f), the color is output by being converted in correspondence of the value of a which is determined by the degree of the likelihood of the original being a bill or a stock. Consequently, when a is large, the reproduced color changes totally from that of the original, so that the reproduced copy cannot be used as a circulatable one as a bill or a stock. However, the contents (number or the like) given in the stock can be preserved as a record. Meanwhile, with respect to an original image whose degree of likelihood of being a bill or a stock is low, the change in color is suppressed to a small level by making a small. It goes without saying that other methods may be used as the method of changing the color.

As described above, in accordance with the seventh embodiment of the present invention, since the image conversion is effected in correspondence with the degree of the likelihood of the original being a bill or a stock, it is possible to form an image having a certain degree of picture quality even with respect to an original for which a determination is difficult. Hence, the amount of copies for which a determination of an "erroneous copy" is made can be reduced.

Figure 17:
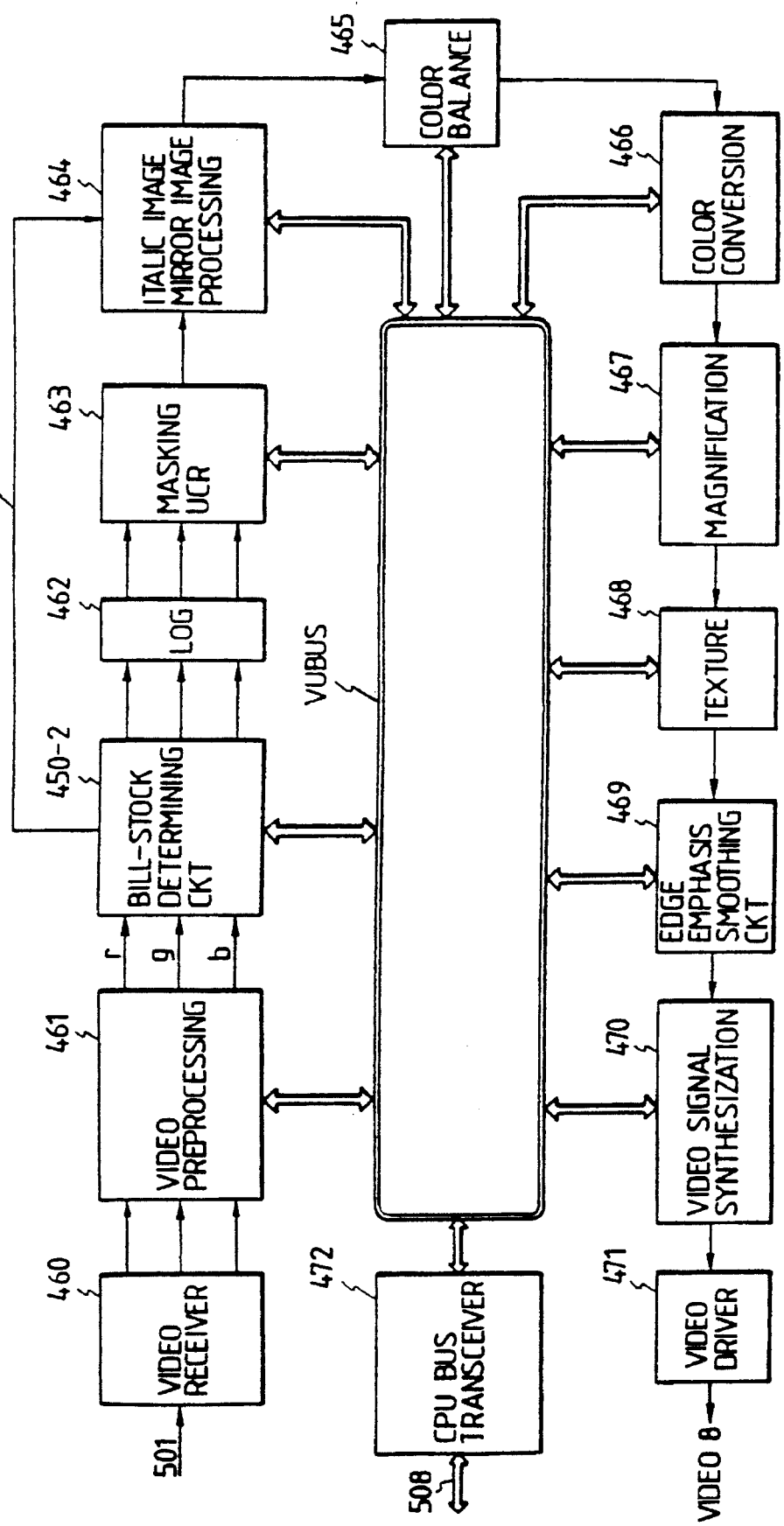
FIG. 17 is a block diagram illustrating an example of the arrangement of a bill-stock recognizing circuit in accordance with an eighth embodiment.

FIG. 17 illustrates an eighth embodiment of the present invention.

In the drawing, a bill-stock determining circuit is designated at 450-2, and in this embodiment, the arrangement is such that a CPU is provided to effect control in correspondence with the degree of the "likelihood of the original being a bill or a stock certificate". A signal line 488 is adapted to control the degree of an italic image with respect to the italic image/mirror image processing circuit 464.

Figure 18:
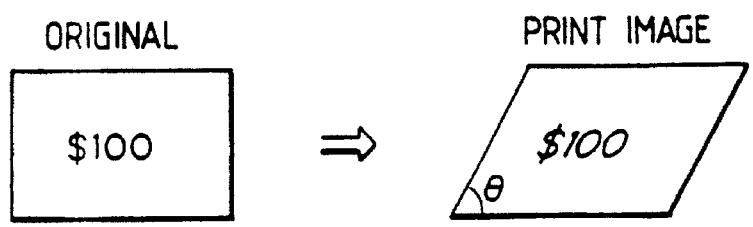
FIG. 18 is a diagram illustrating the form of image change on the basis of the result of recognition in accordance with a seventh embodiment.

In conversion into an italic image, the configuration of the image is deformed as shown in FIG. 18. By virtue of the processing by the circuit 450-2, control can be effected via a signal 488 in such that manner that θ is set increasingly close to 0° from 90° in correspondence with the degree of the likelihood of the original being a bill or a stock.

Thus, in this embodiment, since the italic image/mirror image processing circuit 464 is controlled directly by the bill-stock determining circuit 450-2 to a degree corresponding to the degree of the likelihood of the original being a bill or a stock certificate, forgery-preventing processing can be effected independently of the CPU 422. Hence, the program of the CPU 422 does not become complicated, and it makes it still more difficult for the would-be forger to obviate the forgery-preventing processing.

Figure 19:
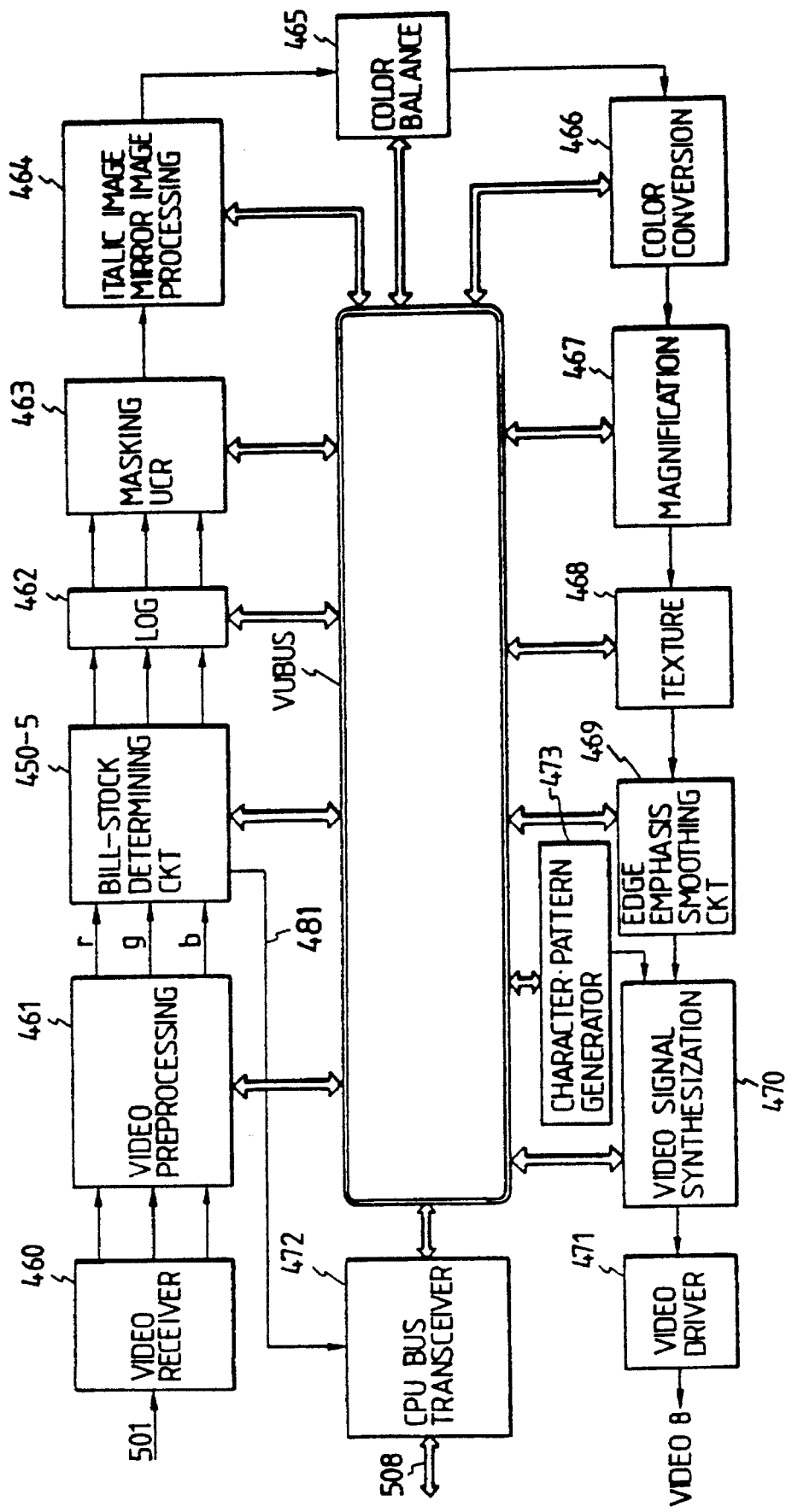
FIG. 19 is a block diagram illustrating the arrangement of a bill stock recognizing circuit in accordance with a ninth embodiment.

FIG. 19 illustrates a ninth embodiment of the present invention.

In the drawing, a bus changeover signal 481 is adapted to control a bus transceiver 472 with respect to the CPU bus 508, and a bill-stock determining circuit 450-5 constantly monitors the video signals r, g, b by operating independently of the CPU 422. If it is determined that the original is likely a bill or a stock, the CPU bus transceiver 472 is closed, and to exclusively use the VUBUS is used. Then, for instance, if specific parameters are written in the italic image/mirror image processing circuit 464, it is possible to print an italic image, as shown in FIG. 18.

Since such a conversion is effected to a degree corresponding to the degree of the likelihood of original being a bill or a stock, when a determination is made that the original is obviously a bill or a stock (when the degree of likelihood is large), a printed image which can be clearly distinguished from an authentic one is output, thereby making it possible to prevent forgery. On the other hand, if the determination is not clear-cut (the degree of probability is small, the conversion is effected at a small degree, with the result that the possibility of imparting unexpected trouble to the operator is small.

FIGS. 20(a)–(c) illustrates other examples in which the output processing corresponding to the degree is effected forcedly.

Figure 20:
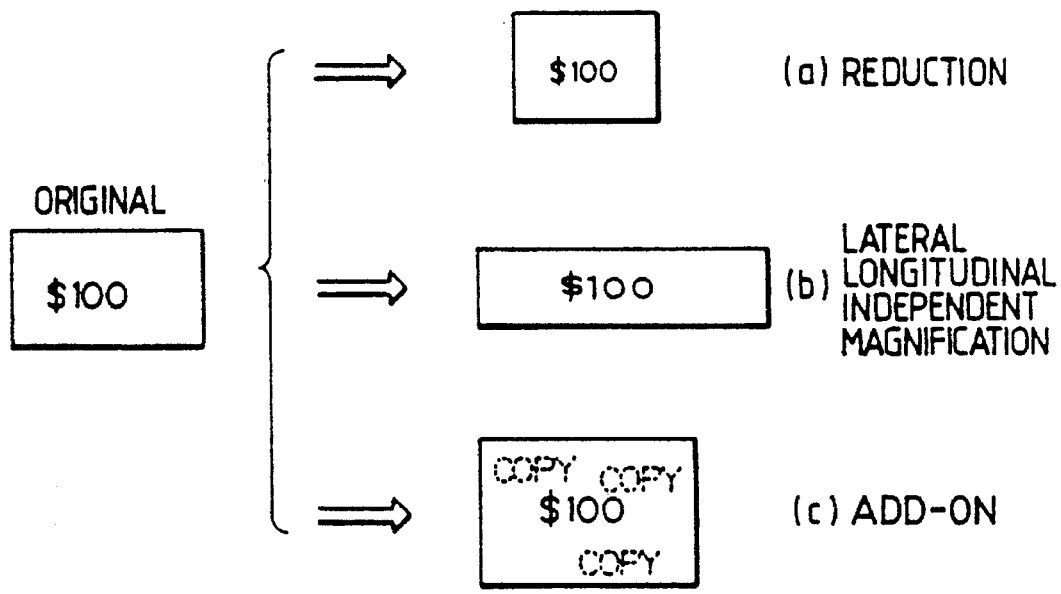
FIG. 20 is a diagram illustrating the form of image change on the basis of the arrangement shown in FIG. 19.

FIG. 20(a) is an example in which the image is output by being reduced in correspondence with the degree of the likelihood of the original being a bill or a stock by controlling the magnification processing circuit 467. In addition, FIG. 20 (b) is also an example in which an image is output by being subjected to lateral longitudinal independent magnification in correspondence with the degree of the likelihood of the original being a bill or a stock. Furthermore, FIG. 20(c) is an example in which an image is output with the characters "copy" added on with a size or density corresponding to the degree of the likelihood of being a bill or a stock by controlling the video signal synthesization circuit 470 and the character-pattern generator 473.

In addition, the color balance may be changed by controlling the color balance processing circuit 465, or an image may be output with a mosaic texture corresponding to the degree of its likelihood by controlling the texture processing circuit. Alternatively, an image may be output after being subjected to blurring processing through filtering in correspondence with the detected degree of likelihood by controlling the edge emphasis smoothing processing circuit 469.

Since the arrangement is provided such that processing for forgery prevention is carried out in the video processing unit 412, it is possible to assure the forgery prevention more positively.

Figure 21:
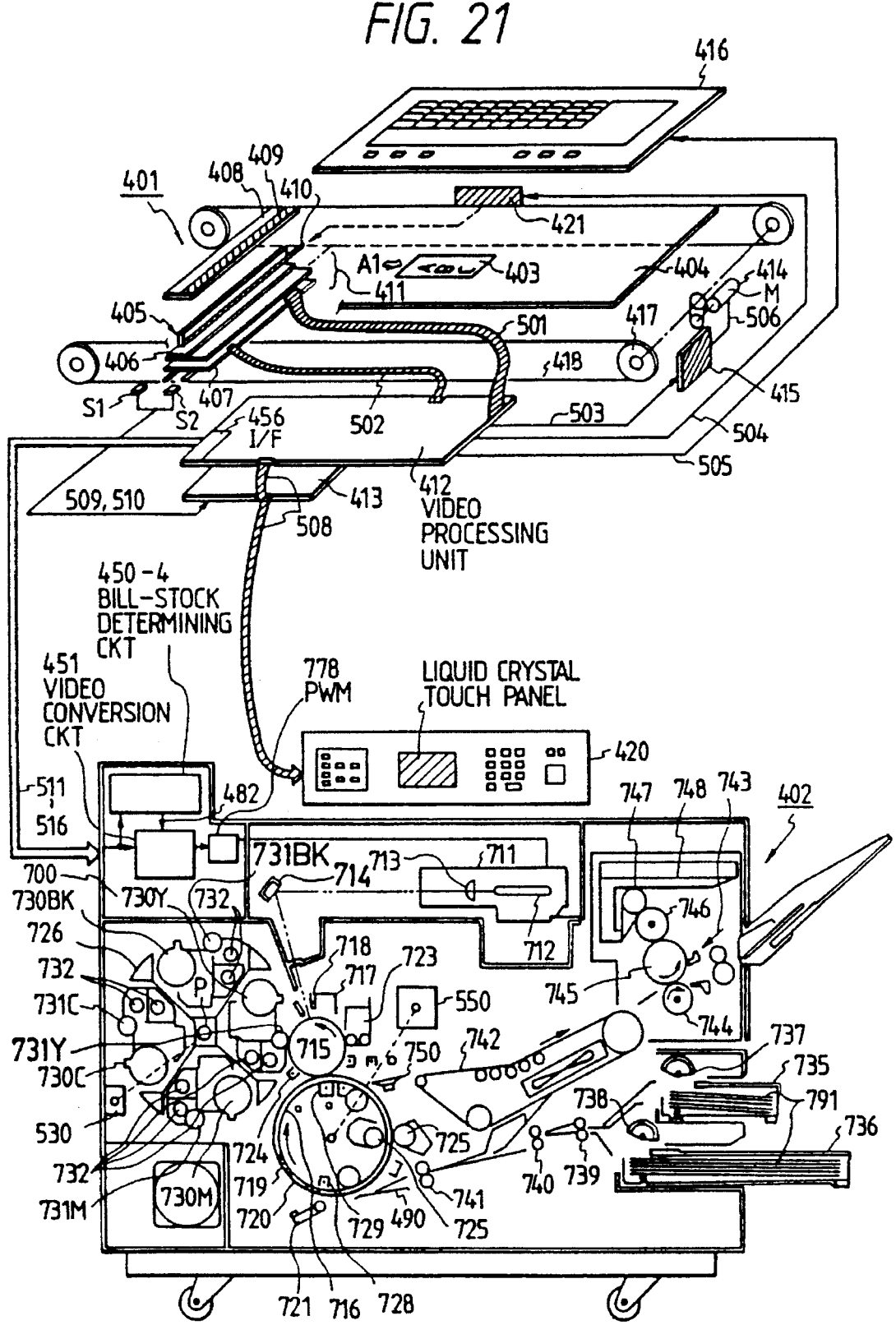
FIG. 21 is a diagram illustrating an image processing apparatus in accordance with a tenth embodiment of the invention.

FIG. 21 illustrates an arrangement in which a forgery preventing device is provided on the printer 402 side in accordance with a tenth embodiment of the present invention.

In the drawing, a bill-stock determining circuit 450-4 is provided in a printer controller 700, and monitors the video signals that are input sequentially thereinto. Upon determining that the original is a bill or a stock in the same way as described above, the bill-stock determining circuit 450-4 controls the video conversion circuit 451. Then, a printed image is changed substantially from the original by providing appropriate processing, such as by thinning out the image, making the lines smaller or larger, using half-tone dots, and adding on characters.

Figure 22:
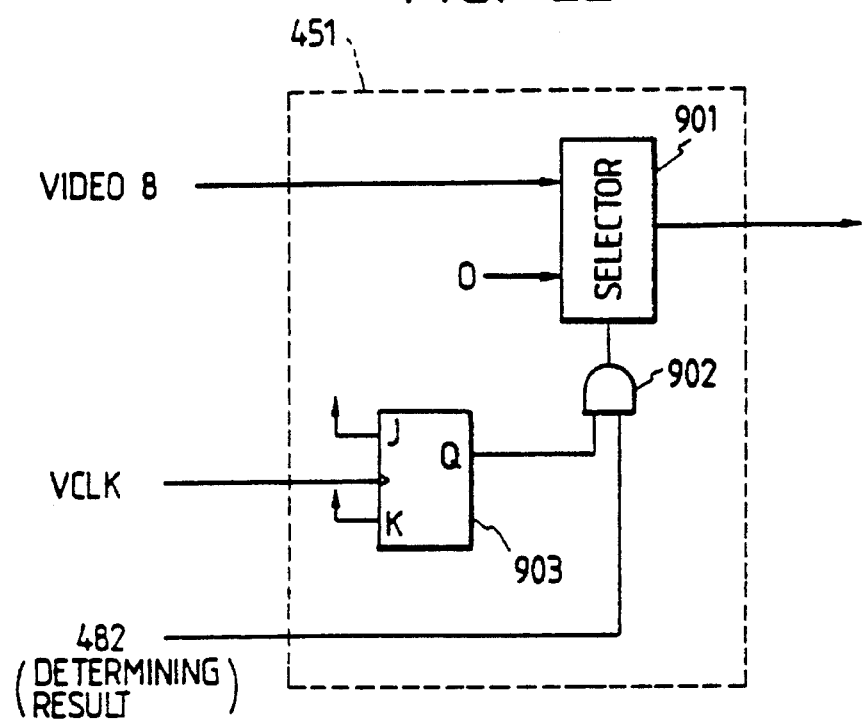
FIG. 22 is a block diagram illustrating an example of the arrangement of a video conversion circuit shown in FIG. 21.

FIG. 22 illustrates an example of the video conversion circuit 451 which is adapted to effect thinning out based on result 482 of the determination as to the identity of the document. In the drawing, reference numeral 901 denotes a selector, while 902 denotes an AND gate. Numeral 903 denotes a J-K flip-flop, which effects thinning out for each picture element selected.

Figure 23:
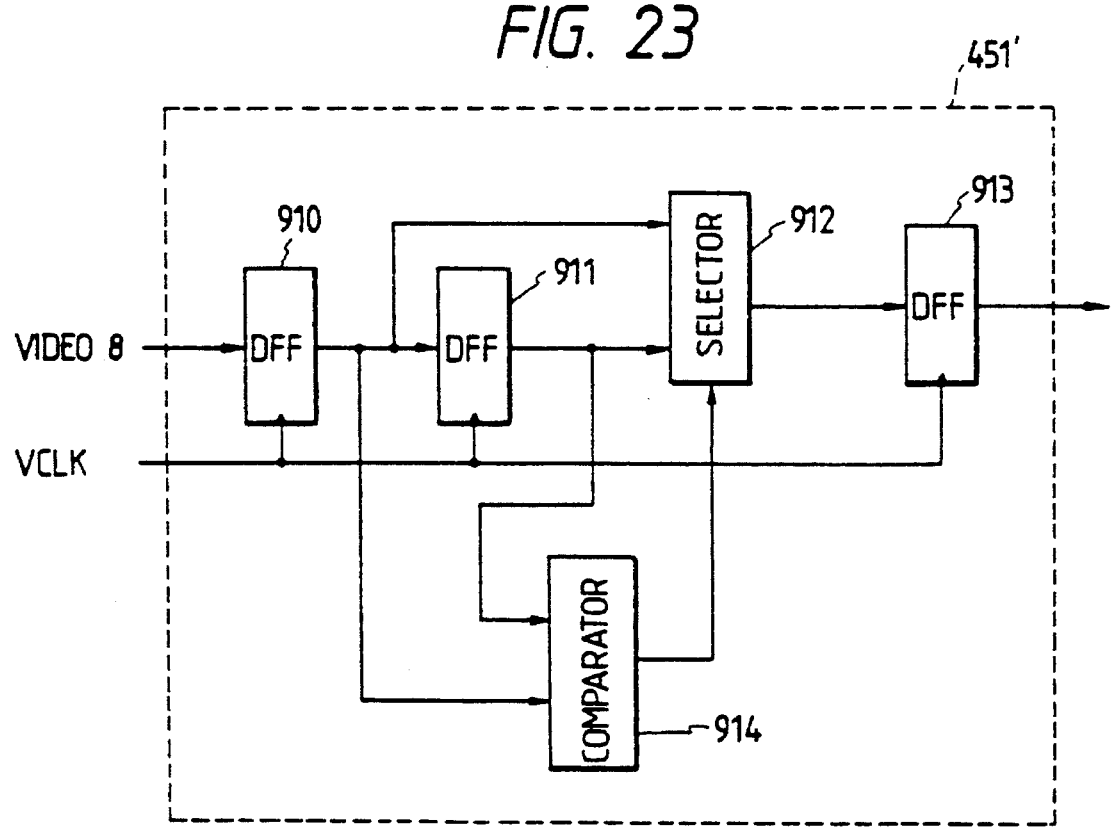
FIG. 23 is a block diagram illustrating another example of the arrangement of the video conversion circuit shown in FIG. 21.

FIG. 23 is an example of a video conversion circuit 451' for making lines smaller (or larger). In the drawing, numerals 910, 911 and 913 denote D-type flip-flops, while 912 denotes a selector. Numeral 914 denotes a comparator, and if an arrangement is provided such that a small (or larger)

value is selected by the selector 912, it is possible to make the lines smaller (or larger) in the main scanning direction.

With respect to half-tone processing, an example of a processing circuit is not illustrated, but an arrangement may be provided such that a fine pattern of a bill or the like is made to form a moiré by subjecting a video image to fine-dot processing.

As described above, in accordance with this embodiment, since a forgery preventing device is incorporated on the printer side, it is possible to effectively prevent forgery even in a case where an image is read by a reader which is not provided with a forgery preventing device.

It should be noted that the circuit for determining a bill or a stock is not confined to those of the above-described embodiments, and it goes without saying that any circuit which achieves the desired results may be used for the same. In addition, as for the printer as well, not only the electrophotographic type of the above-described embodiments but also various other types may be used.

Figure 24:
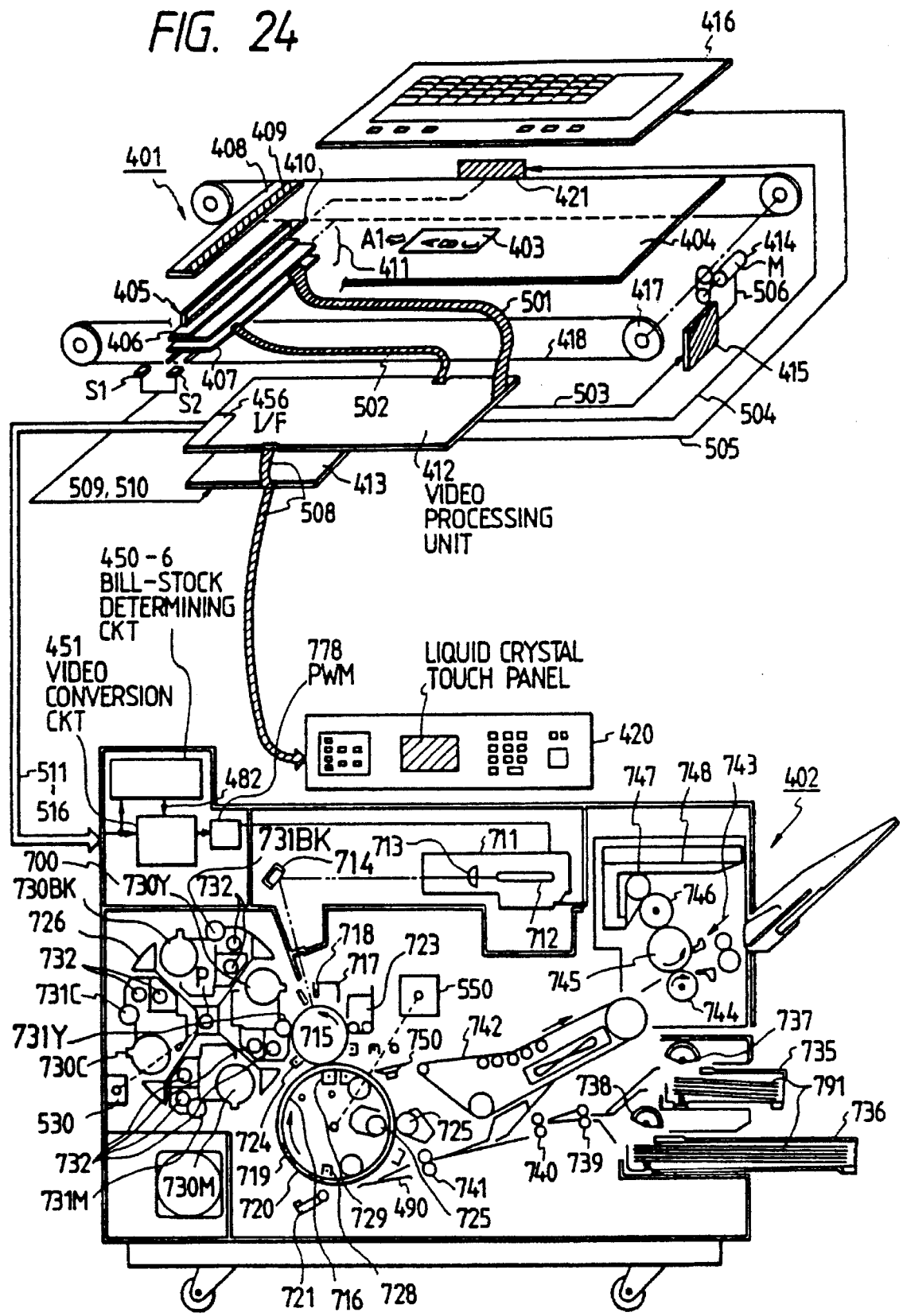
FIG. 24 is a diagram illustrating an image processing apparatus in accordance with an eleventh embodiment of the invention.

FIG. 24 illustrates an example in which a forgery preventing device is provided on the printer 402 side in accordance with an eleventh embodiment of the present invention.

In the drawing, a bill-stock determining circuit provided in the printer controller 700 is denoted by 450-6, and monitors video signals that are input sequentially thereinto. Upon determining that the original is a bill or a stock in the same way as described above, the bill-stock determining circuit 450-6 controls the video conversion circuit 451, in correspondence with the aforementioned degree of "likelihood". Then, a printed image is changed substantially from the original as appropriate processing is provided in correspondence with the degree, such as by thinning out the image, making the lines smaller or larger, using half-tone dots, and adding on characters.

Figure 25:
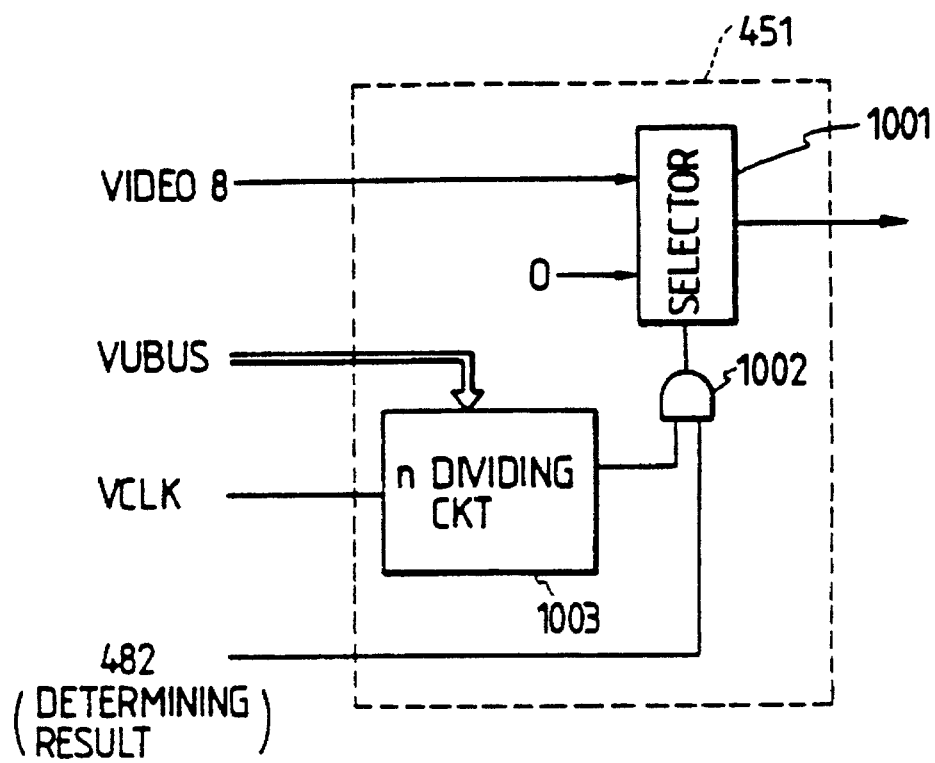
FIG. 25 is a block diagram illustrating an example of the arrangement of the video conversion circuit shown in FIG. 24.

FIG. 25 illustrates an example of the video conversion circuit 451 which is adapted to effect thinning out based on result 482 of the determination as to the identity of the document. In the drawing, reference numeral 1001 denotes a selector, while 1002 denotes an AND gate. An n-dividing counter 1003 outputs "1" once for each n-number of picture elements, and the elector 1001 selects 0 instead of the signals once for each n-number of picture elements via the AND gate 1002, thereby performing the thinning-out operation.

As described above, in accordance with this embodiment, since a forgery preventing device is incorporated on the printer side, it is possible to effectively prevent forgery even in a case where an image is read by a reader which is not provided with a forgery preventing device.

It should be noted that the circuit for determining a bill or a stock is not confined to those of the above-described embodiments, and it goes without saying that any circuit which can provide the desired result may be used for the same. In addition, as for the printer as well, not only the electrophotographic type of the above-described embodiments but also various other types may be used.

Figure 26:
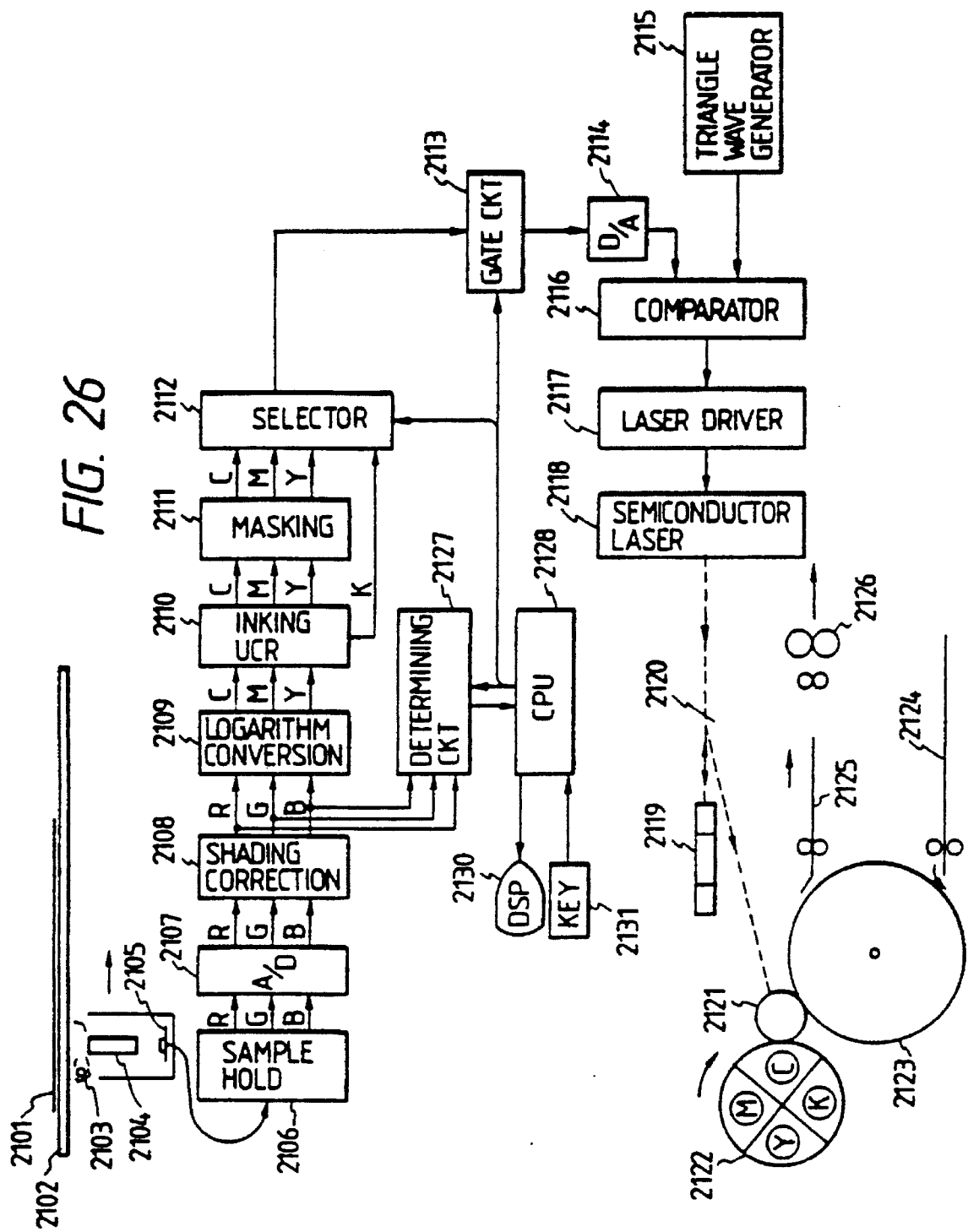
FIG. 26 is a block diagram illustrating a circuit configuration in accordance with a twelfth embodiment.

FIG. 26 illustrates a circuit diagram of a twelfth embodiment of the present invention which is applied to a color image reproducing apparatus using a laser beam printer.

In the drawing, a color original 2101 to be duplicated is placed on an original mounting glass table 2102. A light source 2103 is adapted to illuminate the original 2101, while a converging rod lens array 2104 (e.g., Selfock (tradename) lens array) which forms on a CCD line sensor 2105 an image of the light (an image of the original) reflected from the original illuminated by the light source 2103. The CCD line sensor 2105 is arranged such that filters of red (R), green (G), and blue (B) are applied on the line alternately, and converts the image of the original into electrical signals by separating it into the three primary colors. The aforementioned components 2103–2105 are integrally accommodated in a reading head (carriage) and is made to effect scanning by a scanning mechanism (not shown) in the direction of the arrow (subscanning direction) shown in the drawing, thereby scanning and reading the image depicted on the original 2101.

In addition, a sample hold circuit 2106 sample holds analog electrical signals (video signals) sent from the line sensor 2105 and converts them into time series signals of R, G, B. An A/D (analog-digital) converter 2107 subjects output signals from this sample hold circuit 2106 to analog-digital conversion. A shading correction circuit 2108 corrects variations in the sensitivity for one CCD line of the CCD line sensor 2105 and unevenness in illumination. A logarithm conversion circuit 2109 converts the R, G, and B signals corrected by the shading correction circuit 2108 into complementary-color density signals of cyan (C), magenta (M), and yellow (Y). Reference numeral 2110 denotes an inking circuit for generating ink (K, black) signals by extracting the minimum value among the C, M, and Y signals output from the logarithm conversion circuit 2109 and also denotes a UCR circuit for subtracting from the Y, M, and C signals a component corresponding to the K signal. A masking circuit 2111 corrects unnecessary absorption and the like of an output-side coloring material. A selector circuit 2112 selects signals to be sent to the printer (a laser beam printer in this embodiment) from among the Y, M, C, and K signals obtained as described above.

In addition, a gate circuit 2113 turns on and off outputs sent from the selector 2112 to the printer in response to control signals from a CPU (central arithmetic processing unit) 2128. A D/A (digital/analog) converter 2124 converts digital signals sent from the reader via the gate circuit 2113 into analog signals. A comparator 2116 compares the output of the D/A converter 2114 with a triangle wave signal of a predetermined period produced from a triangle wave generator 2115, obtaining a pulse width modulation (PWM) signal having a pulse width proportional to the image signal. This PWM signal is applied to a semiconductor laser 2118 via a laser driver 2117.

The light beam issued by the semiconductor laser 2118 is modulated by that PWM signal and reaches a rotating photosensitive drum 2121 (see the broken line in the drawing) via a polygonal mirror 2119 rotating at high speed and a reflecting mirror 2120.

An electrostatic latent image formed on the photosensitive drum 2121 upon application of the laser beam is developed by a rotary developing device 2122 sequentially in the order of C, M, Y, and K, and is recorded as toner images of the respective colors. This toner image is transferred onto copy paper 2124 on the transfer drum 2123 sequentially in the order of C, M, Y, and K. The copy paper 2124 is conveyed from a paper cassette (not shown) and is wound around the transfer drum 2123. Upon completion of the transfer of C, M, Y, and K images on four occasions, the printed copy paper proceeds through the position indicated at 2125 is subjected to thermal fixing by a fixer 2126, and is discharged to the outside as a final reproduced image.

A determining circuit 2127 determines whether or not the pattern on the original 2101 is a specified pattern, and is controlled by the CPU 2128.

In the above-described arrangement, four executions of scanning and reading are necessary with respect to the original 2101 in synchronism with the C, M, Y, and K outputs of the printer, and the selector 2112 changes over the output signals and sends to the printer signals corresponding to C, M, Y, or K. In this embodiment, therefore, the arrangement is such that the determining circuit 2127 is operated by a different algorithm in correspondence with a plurality of times of the original scanning operation, and its determining results are evaluated in a comprehensive manner, thereby improving the accuracy with which a specific pattern is determined.

Referring now to FIG. 27, a detailed description will be given of the operation of the above-described determining circuit 2127. FIG. 27 illustrates a detailed internal circuit configuration of the determining circuit 2127. The R, G, and B signals from the shading correction circuit 2108 shown in FIG. 26 are respectively subjected to binary processing by comparators 2201–2203 in the light of predetermined threshold values from threshold value store 2204. An AND circuit 2205 calculates a logical product of the results of this binary processing, and outputs "1" only to the picture element which exceeds the threshold value with respect to all of R, G, and B.

Figure 28:
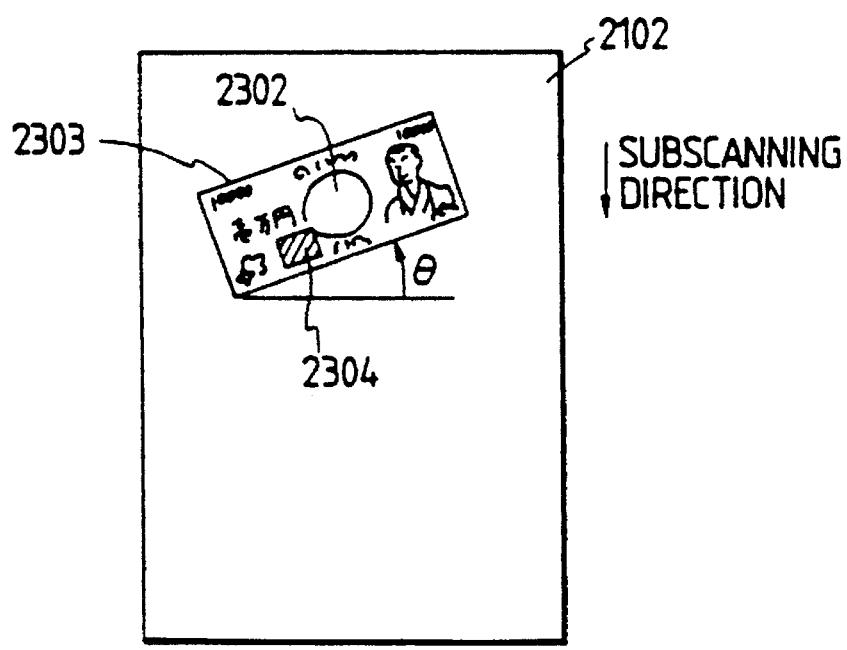
FIG. 28 is a top plan view illustrating a state at the time of reading and scanning an input original.

An edge point detection circuit 2206 detects an edge point of the image of the original, and, when, as shown in FIG. 28, a bill 2302, i.e., the original 2101, is placed on the original-mounting glass table 2102, this circuit 2206 detects an edge point on one side of the bill 2302 (a point on a straight line 2303). An angle detection circuit 2207 detects a rotating angle θ (see FIG. 28) of the bill 2302 on the basis of the result of detection by the edge point detection circuit 2206. An affine conversion circuit 2208 cuts off a part (e.g., a hatched portion indicated at 2304 in FIG. 28) of an input image of the original on the basis of the detection result θ of the angle detection circuit 2207 and effects rotation by (−θ) so as to be written in a memory 2209.

By virtue of the above-described arrangement, an image is written in a memory 2209 in the state in which the cut-out portion 2304 is not rotated. Meanwhile, a normal image pattern corresponding to the aforementioned cut-out portion 2304 is written in a memory 2210 from the CPU 2128. Then, the contents of the memory 2209 and the contents of the memory 2210 are superposed on each other in a matching circuit 2211, and a value of their correlation is determined. The value of correlation determined by the matching circuit 2211 is output again to the CPU 2128, where, on the basis of the value of correlation, a determination is made as to whether or not the input image coincides with a normal image pattern (hereinafter referred to as the normal pattern.

In the above-described operation, there is clearly an uncertainty of ±180° in angle detection in the angle detection circuit 2207, so that a single calculation of matching does not lead to a proper determination with respect to an image inverted by 180°. For this reason, in this embodiment, if an upright proper pattern is written in the memory 2210 in the first scanning of the original, while an inverted (180° inverted) proper pattern is written therein in the second scanning of the original, the 180° uncertainly can be overcome in two scanning and determining operations. Namely, in FIG. 26, the first scanning and determination are made to correspond to the outputting of a cyan image, while the second scanning and determination are made to correspond to the outputting of a magenta image, and if a determination is made on the basis of either of the two determining results that the input image coincides with the proper pattern, the the CPU 2128 immediately turns off the gate circuit 2113, cutting off an output of the image signal to the printer. By virtue of this arrangement, since at least the yellow image and the black image are not written onto the photosensitive drum 2121, the duplicated image outputted to the copy paper can be clearly discriminated from the input original, making it possible to suit the purpose of forgery prevention.

Referring now to FIG. 27, a description will be given of a modification of this embodiment. In this modification, the above-described uncertainty concerning 180° can be overcome at one time by the provision of two systems of the circuit having a configuration such as the one shown in FIG. 27. Furthermore, the reading density is changed for the first scanning and the second scanning. Namely, during the first reading scanning, an image thinned out for each other picture element in the affine conversion circuit 2208 is written in the memory 2209, while, during the second reading scanning, the image is not thinned out and is written in the memory 2209 as it is with the density which has been read. Proper patterns corresponding to respective densities are written in advance in the memory 2210. By virtue of this arrangement, even in cases where it is impossible to obtain a value of sufficient correlation during the first matching, if a value of high correlation can be obtained during the second matching, the CPU 2128 can determine that the input image has coincided with the proper pattern.

As the other embodiments, the following various types are conceivably adopted:

Threshold values supplied to the comparators 2201 and the 2203 shown in FIG. 27 are varied during the first and second scannings.

An image to be written in the memory 2209 shown in FIG. 27 is shifted by the portion of a number of picture elements during the first and second scannings, thereby absorbing the misregistration between the input pattern and the proper pattern.

The proper pattern to be written in the memory 2210 shown in FIG. 27 is varied during the first and second scannings. For instance, the pattern of a ten thousand yen note is used during the first scanning, while the pattern is changed to the pattern of a thousand yen note during the second scanning.

In the foregoing embodiment, it goes without saying that the number of scannings is not restricted to two. In addition, the the number of scannings is not restricted to four times or less. For instance, the following processing is possible: If a determination is made during four or less scannings that the input image is close to a proper pattern, determination processing is continued by carrying out only the original scanning without discharging the copy paper from the transfer drum 2123, and the fifth transfer is effected when the input image coincides with the proper pattern, whereupon the overall surface of the duplicated copy is inked out.

A description will now be given of another modification of the twelfth embodiment of the present invention.

In this modification, an image is not output during the determining process of the first scanning, and if it is determined in this process that the original is close to a proper pattern of a bill or the like, scanning is stopped at that point of time. When it is not determined that the original is close to the proper pattern, four readings of images corresponding to C, M, Y, and K are continuously made and outputs of video signals are delivered to the printer, outputting a duplicated image.

When the scanning is suspended, a message is output from the CPU 2128 to a liquid crystal display 2130 or the like to the effect that the operator should rearrange the original or take other appropriate step, thereby prompting a restart. When a restart is designated by the operator through a key 2131, the determining and duplication processing such as those described above are restarted.

By virtue of this arrangement, it is possible to overcome faults in determination caused by a slight mispositioning of the original, angular errors thereof, etc.

The above-described method of determining a specific image by abstracting a specific pattern can be applied to all of the above-described embodiments.

As described above, in accordance with the twelfth embodiment of the present invention, the operation of effecting a determination by extracting a specific pattern from an image of the original is repeated a plurality of times, and the results of the repeated determinations are evaluated in a comprehensive manner, a final determination is made as to whether or not a specific pattern is included in the image of the original. Hence, it is possible to obtain the following advantages: The accuracy with which the determination is made is improved substantially, and the forgery preventing function of the color image copying apparatus is enhanced. At the same time, the possibility of hindering normal copying operations can be reduced to a remarkable degree.

The present invention is not restricted to the above-described embodiments, and various other modifications are possible without departing from the spirit of the invention which is solely defined in the appended claims.

What is claimed is:

1. An image processing apparatus comprising:

scanning means for scanning an original and generating electrical image data representing an image of the original to be processed;

processing means for processing the electrical image data supplied by said scanning means; and determining means for determining whether or not the original represented by the electrical image data contains a specified image, based on the electrical image data supplied by said scanning means, wherein said scanning means scans the same original a plurality of times and said determining means performs its determination operation on the same original a plurality of times in response to scanning the original by said scanning means.

2. An apparatus according to claim 1, wherein said processing means and said determining means are commonly supplied with the electrical image data by said scanning means.

3. An apparatus according to claim 1, wherein said scanning means includes a sensor for supplying data representing a plurality of colors.

4. An apparatus according to claim 1, further comprising controlling means for prohibiting or changing image reproduction by said processing means when said determining means determines that the original represented by the electrical image data contains the specified image.

5. An apparatus according to claim 4, wherein said controlling means is capable of inhibiting image output.

6. An apparatus according to claim 4, wherein said controlling means is capable of inhibiting said scanning means after initiation of the scanning sequence.

7. An apparatus according to claim 4, wherein said controlling means is capable of inhibiting the output of said scanning means.

8. An apparatus according to claim 4, wherein said controlling means is capable of changing the electrical image data output from said processing means.

9. An apparatus according to claim 4, wherein said controlling means are provided to effect, at a plurality of timings, scanning of the original by said scanning means, and for allowing said determining means to effect repeatedly a determining operation each such scanning.

10. An apparatus according to claim 9, wherein said controlling means changes a reading density of a scanning operation of said scanning means during a first and a second scanning.

11. An apparatus according to claim 4, wherein said controlling means is capable of actuating a means for disposing of an illegal copy produced by said processing means.

12. An apparatus according to claim 4, wherein said controlling means effects a change of a reproduction image.

13. An apparatus according to claim 1, wherein said processing means includes a laser beam printer.

14. An image processing method comprising the steps of:

scanning an original and generating electrical image data representing an image of the original to be processed;

processing the electrical image data supplied; and determining whether or not the original represented by the electrical image data contains a specified image based on the electrical image data supplied, wherein said scanning step is carried out on the same original a plurality of times and said determining step is effected on the same original a plurality of times, once for each scanning.

* * * * *

UNITED STATES PATENT AND TRADEMARK OFFICE
CERTIFICATE OF CORRECTION

PATENT NO. : 5,583,614
DATED : December 10, 1996
INVENTOR(S) : KAMON HASUO, ET AL.

Page 1 of 4

It is certified that error appears in the above-indentified patent and that said Letters Patent is hereby corrected as shown below:

Title page, insert

References Cited item [56], U.S. PATENT DOCUMENTS

Page 2, "4,908,873 3/1980 Philibert et al...................382/100" should read --4,908,873 3/1990 Philibert et al............382/100--.

[56] FOREIGN PATENT DOCUMENTS

Page 2, "2155860 10/1985 United Kingdom" should read --2155860A 10/1985 United Kingdom--.

COLUMN 1

Line 53, "copies" should read --copied--, and "an" should read --a--.

COLUMN 4

Line 58, "discharged paper" should read --discharged-paper--.

UNITED STATES PATENT AND TRADEMARK OFFICE
CERTIFICATE OF CORRECTION

PATENT NO. : 5,583,614
DATED : December 10, 1996
INVENTOR(S) : KAMON HASUO, ET AL.

It is certified that error appears in the above-indentified patent and that said Letters Patent is hereby corrected as shown below:

COLUMN 5
Line 44, "discharged paper" should read --discharged-paper--.

COLUMN 6
Line 14, "where and" should read --and--.

COLUMN 8
Line 55, "octahedron)," should read --an octahedron),--.

COLUMN 12
Line 40, "5103)." should read --S103).--.

COLUMN 13
Line 35, "iTOP" should read --ITOP--.

COLUMN 14
Line 67, "463." should read --463:--.

UNITED STATES PATENT AND TRADEMARK OFFICE
CERTIFICATE OF CORRECTION

PATENT NO. : 5,583,614
DATED : December 10, 1996
INVENTOR(S) : KAMON HASUO, ET AL.

Page 3 of 4

It is certified that error appears in the above-indentified patent and that said Letters Patent is hereby corrected as shown below:

COLUMN 15
Line 15, "a" should read --α--;
Line 16, "a" should read --α--; (3rd occurrence)
Line 24, "a" should read --α--;
Line 29, "stock," should read --stock certificate,--;
Line 46, "that manner" should read --a manner--; and
Line 66, "to" and "use" should be deleted.

COLUMN 16
Line 4, "original" should read --the original--;
Line 10, "small," should read --small),--; and
Line 27, "of being" should read --of the original being--.

COLUMN 17
Line 42, "elector" should read --selector--.

UNITED STATES PATENT AND TRADEMARK OFFICE
CERTIFICATE OF CORRECTION

PATENT NO. : 5,583,614
DATED : December 10, 1996
INVENTOR(S) : KAMON HASUO, ET AL.

It is certified that error appears in the above-indentified patent and that said Letters Patent is hereby corrected as shown below:

COLUMN 19
Line 48, "pattern." should read --pattern).--.

COLUMN 20
Line 41, "the the" should read --the--.

Signed and Sealed this

Tenth Day of June, 1997

Attest:

BRUCE LEHMAN

Attesting Officer    Commissioner of Patents and Trademarks